United States Patent
Luo

(10) Patent No.: US 8,522,101 B2
(45) Date of Patent: Aug. 27, 2013

(54) PHYSICAL HARQ INDICATOR CHANNEL (PHICH) RESOURCE ASSIGNMENT SIGNALING IN A WIRELESS COMMUNICATION ENVIRONMENT

(75) Inventor: Tao Luo, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 941 days.

(21) Appl. No.: 12/422,934

(22) Filed: Apr. 13, 2009

(65) Prior Publication Data

US 2009/0259909 A1    Oct. 15, 2009

Related U.S. Application Data

(60) Provisional application No. 61/045,215, filed on Apr. 15, 2008.

(51) Int. Cl.
*G06F 11/00* (2006.01)

(52) U.S. Cl.
USPC ............................ 714/748; 714/746; 714/749

(58) Field of Classification Search
USPC ........................ 714/748, 749, 750, 751, 752
See application file for complete search history.

(56) References Cited

U.S. PATENT DOCUMENTS

| | | | |
|---|---|---|---|
| 2005/0286612 A1* | 12/2005 | Takanashi ...................... | 375/147 |
| 2006/0092972 A1 | 5/2006 | Petrovic et al. | |
| 2006/0146745 A1* | 7/2006 | Cai et al. ....................... | 370/328 |
| 2006/0195576 A1* | 8/2006 | Rinne et al. ................... | 709/226 |
| 2007/0011550 A1 | 1/2007 | Agrawal et al. | |
| 2007/0106924 A1* | 5/2007 | Seidel et al. .................. | 714/748 |
| 2008/0192718 A1* | 8/2008 | Jongren et al. ................ | 370/342 |
| 2009/0046605 A1* | 2/2009 | Gao et al. ...................... | 370/280 |
| 2009/0109906 A1* | 4/2009 | Love et al. .................... | 370/329 |

FOREIGN PATENT DOCUMENTS

| | | |
|---|---|---|
| WO | 2006130541 A2 | 12/2006 |
| WO | 2007024780 | 3/2007 |
| WO | WO2007148198 A2 | 12/2007 |

OTHER PUBLICATIONS

Catt et al., "Indication of PHICH resource for TDD" SGPP Draft; R1-081326, 3rd Generation Partnership Project (3GPP), Mobile Competence Centre ; 650, Route Des Lucioles ; F-06921 Sophia-Antipolis Cedex; France, vol. RAN WG1, no. Shenzhen, China; 20080331, Mar. 26, 2008, XP050109752 paragraph 2.1. (pp. 1-6).
International Search Report and Written Opinion—PCT/US2009/040719, International Search Authority—European Patent Office—Sep. 10, 2009.

(Continued)

*Primary Examiner* — Sarai Butler
(74) *Attorney, Agent, or Firm* — Larry J. Moskowitz

(57) ABSTRACT

Systems and methodologies are described that facilitate signaling Physical Hybrid Automatic Repeat Request (HARQ) Indicator Channel (PHICH) resource assignments in a wireless communication environment. At least a portion of a current PHICH resource assignment for a current Transmission Time Interval (TTI) and at least a portion of a subsequent PHICH resource assignment for a subsequent TTI can be encoded within a common encoded signal. Further, the common encoded signal can be sent to an access terminal during the current TTI. For instance, the common encoded signal can be transmitted via a Physical Broadcast Channel (PBCH). Alternatively, the common encoded signal can be sent through dedicated Radio Resource Control (RRC) signaling during handover. The access terminal can decode the common encoded signal received from the base station to identify the current PHICH resource assignment (or portion thereof) and the subsequent PHICH resource assignment (or portion thereof).

50 Claims, 13 Drawing Sheets

(56) References Cited

OTHER PUBLICATIONS

Nokia et al., "PHICH resource mapping/dimensioning for TDD" 3GPP Draft; R1-080923, 3rd Generation Partnership Project (SGPP), Mobile Competence Centre ; 650, Route Des Lucioles ; F-06921 Sophia-Antipolis Cedex; France, vol. Ran WG1, no. Sorrento, Italy; 20080211, Feb. 5, 2008, XP050109396. (pp. 1-3).

3GPP: 3rd Generation Partnership Project. "Technical Specification Group Radio Access Network; Evolved Universal Terrestrial Radio Access (E-UTRA); Physical layer procedures (Release 8)." 3GPP TS 36.213 V8.2.0 (Mar. 2008).

Qualcomm Europe, "PHICH resource allocation", 3GPP TSG-RAN WG1 #52, R1-080644, Feb. 11th-15th, 2008, pp. 1-3.

\* cited by examiner

PHYSICAL HARQ INDICATOR CHANNEL (PHICH) RESOURCE ASSIGNMENT SIGNALING IN A WIRELESS COMMUNICATION ENVIRONMENT

CROSS-REFERENCE TO RELATED APPLICATIONS

This application claims the benefit of U.S. Provisional Patent Application Ser. No. 61/045,215 entitled "METHODS OF SIGNALING PHICH RESOURCE USAGE IN A WIRELESS COMMUNICATION SYSTEM" which was filed Apr. 15, 2008. The entirety of the aforementioned application is herein incorporated by reference.

BACKGROUND

I. Field

The following description relates generally to wireless communications, and more particularly to signaling Physical HARQ Indicator Channel (PHICH) resource assignments in a wireless communication system.

II. Background

Wireless communication systems are widely deployed to provide various types of communication; for instance, voice and/or data can be provided via such wireless communication systems. A typical wireless communication system, or network, can provide multiple users access to one or more shared resources (e.g., bandwidth, transmit power, ... ). For instance, a system can use a variety of multiple access techniques such as Frequency Division Multiplexing (FDM), Time Division Multiplexing (TDM), Code Division Multiplexing (CDM), Orthogonal Frequency Division Multiplexing (OFDM), and others.

Generally, wireless multiple-access communication systems can simultaneously support communication for multiple access terminals. Each access terminal can communicate with one or more base stations via transmissions on forward and reverse links. The forward link (or downlink) refers to the communication link from base stations to access terminals, and the reverse link (or uplink) refers to the communication link from access terminals to base stations. This communication link can be established via a single-in-single-out, multiple-in-single-out or a multiple-in-multiple-out (MIMO) system.

MIMO systems commonly employ multiple ($N_T$) transmit antennas and multiple ($N_R$) receive antennas for data transmission. A MIMO channel formed by the $N_T$ transmit and $N_R$ receive antennas can be decomposed into $N_S$ independent channels, which can be referred to as spatial channels, where $N_S \leq \{N_T, N_R\}$. Each of the $N_S$ independent channels corresponds to a dimension. Moreover, MIMO systems can provide improved performance (e.g., increased spectral efficiency, higher throughput and/or greater reliability) if the additional dimensionalities created by the multiple transmit and receive antennas are utilized.

MIMO systems can support various duplexing techniques to divide forward and reverse link communications over a common physical medium. For instance, frequency division duplex (FDD) systems can utilize disparate frequency regions for forward and reverse link communications. Further, in time division duplex (TDD) systems, forward and reverse link communications can employ a common frequency region so that the reciprocity principle allows estimation of the forward link channel from reverse link channel.

Wireless communication systems oftentimes employ one or more base stations that provide a coverage area. A typical base station can transmit multiple data streams for broadcast, multicast and/or unicast services, wherein a data stream may be a stream of data that can be of independent reception interest to an access terminal. An access terminal within the coverage area of such base station can be employed to receive one, more than one, or all the data streams carried by the composite stream. Likewise, an access terminal can transmit data to the base station or another access terminal.

In wireless communication environments, a downlink control channel such as, for instance, the Physical Downlink Control Channel (PDCCH), can be transmitted by a base station to an access terminal. The access terminal can decode the downlink control channel to identify resources assigned thereto. The access terminal can further employ the identified resources to decode a downlink packet data channel (e.g., Downlink Shared Channel (DL-SCH), ... ) transmitted by the base station.

To decode the downlink control channel (e.g., PDCCH, ... ), the access terminal typically leverages knowledge of a number of symbols used for the downlink control channel. The number of symbols employed for the downlink control channel can be a function of resource elements used for a Physical Hybrid Automatic Repeat Request (HARQ) Indicator Channel (PHICH). However, conventional techniques (e.g., for time division duplex (TDD) systems, ... ) oftentimes fail to provide information related to a PHICH resource assignment to the access terminal, which can cause the access terminal to attempt to blindly decode the downlink control channel (e.g., PDCCH, ... ) by assuming substantially all possible PHICH resource assignments. Moreover, other common approaches (e.g., for frequency division duplex (FDD) systems, ... ) can leverage signaling a PHICH resource assignment from the base station to the access terminal; yet, typical signaling approaches oftentimes fail to adequately address a scenario where the PHICH resource assignment changes between differing Transmission Time Intervals (TTIs). Due to the foregoing, the access terminal can be subject to increased system acquisition time, elevated complexity of decoding, raised amount of time before successful decoding, and so forth.

SUMMARY

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

In accordance with one or more embodiments and corresponding disclosure thereof, various aspects are described in connection with facilitating signaling of Physical Hybrid Automatic Repeat Request (HARQ) Indicator Channel (PHICH) resource assignments in a wireless communication environment. At least a portion of a current PHICH resource assignment for a current Transmission Time Interval (TTI) and at least a portion of a subsequent PHICH resource assignment for a subsequent TTI can be encoded within a common encoded signal. Further, the common encoded signal can be sent to an access terminal during the current TTI. For instance, the common encoded signal can be transmitted via a Physical Broadcast Channel (PBCH). Alternatively, the common encoded signal can be sent through dedicated Radio Resource Control (RRC) signaling during handover. The access terminal can decode the common encoded signal received from the base station to identify the current PHICH resource assignment (or portion thereof) and the subsequent PHICH resource assignment (or portion thereof).

According to related aspects, a method that facilitates disseminating Physical Hybrid Automatic Repeat Request (HARQ) Indicator Channel (PHICH) resource assignments in a wireless communication environment is described herein. The method can include encoding at least a portion of a current PHICH resource assignment for a current Transmission Time Interval (TTI) and at least a portion of a subsequent PHICH resource assignment for a subsequent TTI within a common encoded signal. Further, the method can include transmitting the common encoded signal to an access terminal during the current TTI.

Another aspect relates to a wireless communications apparatus. The wireless communications apparatus can include a memory that retains instructions related to encoding at least a portion of a current Physical Hybrid Automatic Repeat Request (HARQ) Indicator Channel (PHICH) resource assignment for a current Transmission Time Interval (TTI) and at least a portion of a subsequent PHICH resource assignment for a subsequent TTI within a common encoded signal, and sending the common encoded signal to an access terminal during the current TTI. Further, the wireless communications apparatus can include a processor, coupled to the memory, configured to execute the instructions retained in the memory.

Yet another aspect relates to a wireless communications apparatus that enables signaling Physical Hybrid Automatic Repeat Request (HARQ) Indicator Channel (PHICH) resource assignments in a wireless communication environment. The wireless communications apparatus can include means for encoding a current PHICH duration assigned for a current Transmission Time Interval (TTI) and a subsequent PHICH duration assigned for a subsequent TTI upon a common encoded signal. Moreover, the wireless communications apparatus can include means for transferring the common encoded signal to an access terminal during the current TTI.

Still another aspect relates to a computer program product that can comprise a computer-readable medium. The computer-readable medium can include code for encoding a current Physical Hybrid Automatic Repeat Request (HARQ) Indicator Channel (PHICH) duration assigned for a current Transmission Time Interval (TTI) and a subsequent PHICH duration assigned for a subsequent TTI upon a common encoded signal. Moreover, the computer-readable medium can include code for transmitting the common encoded signal to an access terminal during the current TTI.

In accordance with another aspect, a wireless communications apparatus can include a processor, wherein the processor can be configured to yield at least one of a current Physical Hybrid Automatic Repeat Request (HARQ) Indicator Channel (PHICH) resource assignment for a current Transmission Time Interval (TTI) or a subsequent PHICH resource assignment for a subsequent TTI, wherein the current PHICH resource assignment and the subsequent PHICH resource assignment each include a respective PHICH duration, which indicates a number of Orthogonal Frequency Division Multiplexing (OFDM) symbols used for PHICH, and a respective PHICH resource usage, which identifies resource elements used for PHICH. Moreover, the processor can be configured to encode at least a portion of the current PHICH resource assignment and at least a portion of the subsequent PHICH resource assignment within a common encoded signal. Further, the processor can be configured to transmit the common encoded signal to an access terminal during the current TTI.

According to other aspects, a method that facilitates obtaining signaled Physical Hybrid Automatic Repeat Request (HARQ) Indicator Channel (PHICH) resource assignments in a wireless communication environment is described herein. The method can include receiving an encoded signal from a base station sent during a current Transmission Time Interval (TTI). Moreover, the method can include decoding the encoded signal to recognize at least a portion of a current PHICH resource assignment for the current TTI. Further, the method can comprise decoding the encoded signal to identify at least a portion of a subsequent PHICH resource assignment for a subsequent TTI.

Yet another aspect relates to a wireless communications apparatus that can include a memory that retains instructions related to receiving an encoded signal from a base station sent during a current Transmission Time Interval (TTI), and decoding the encoded signal to recognize at least a portion of a current Physical Hybrid Automatic Repeat Request (HARQ) Indicator Channel (PHICH) resource assignment for the current TTI and at least a portion of a subsequent PHICH resource assignment for a subsequent TTI. Further, the wireless communications apparatus can comprise a processor, coupled to the memory, configured to execute the instructions retained in the memory.

Another aspect relates to a wireless communications apparatus that enables receiving signaled Physical Hybrid Automatic Repeat Request (HARQ) Indicator Channel (PHICH) resource assignments in a wireless communication environment. The wireless communications apparatus can include means for receiving an encoded signal from a base station transferred during a current Transmission Time Interval (TTI). Further, the wireless communications apparatus can include means for decoding the encoded signal to identify a current PHICH duration assigned for the current TTI and a subsequent PHICH duration assigned for a subsequent TTI.

Still another aspect relates to a computer program product that can comprise a computer-readable medium. The computer-readable medium can include code for receiving an encoded signal from a base station transferred during a current Transmission Time Interval (TTI) via at least one of a Physical Broadcast Channel (PBCH) or dedicated Radio Resource Control (RRC) signaling during handover. Moreover, the computer-readable medium can include code for decoding the encoded signal to identify a current Physical Hybrid Automatic Repeat Request (HARQ) Indicator Channel (PHICH) duration assigned for the current TTI and a subsequent PHICH duration assigned for a subsequent TTI.

In accordance with another aspect, a wireless communications apparatus can include a processor, wherein the processor can be configured to identify a current Physical Hybrid Automatic Repeat Request (HARQ) Indicator Channel (PHICH) duration allocated for a current Transmission Time Interval (TTI) by decoding an encoded signal obtained from a base station, the encoded signal being sent during the current TTI. Further, the processor can be configured to recognize a subsequent PHICH duration assigned for a subsequent TTI by decoding the encoded signal. Moreover, the processor can be configured to discover a subsequent PHICH resource usage allocated for the subsequent TTI by decoding the encoded signal.

Toward the accomplishment of the foregoing and related ends, the one or more embodiments comprise the features hereinafter fully described and particularly pointed out in the claims. The following description and the annexed drawings set forth herein detail certain illustrative aspects of the one or more embodiments. These aspects are indicative, however, of but a few of the various ways in which the principles of

DETAILED DESCRIPTION

Figure 1:
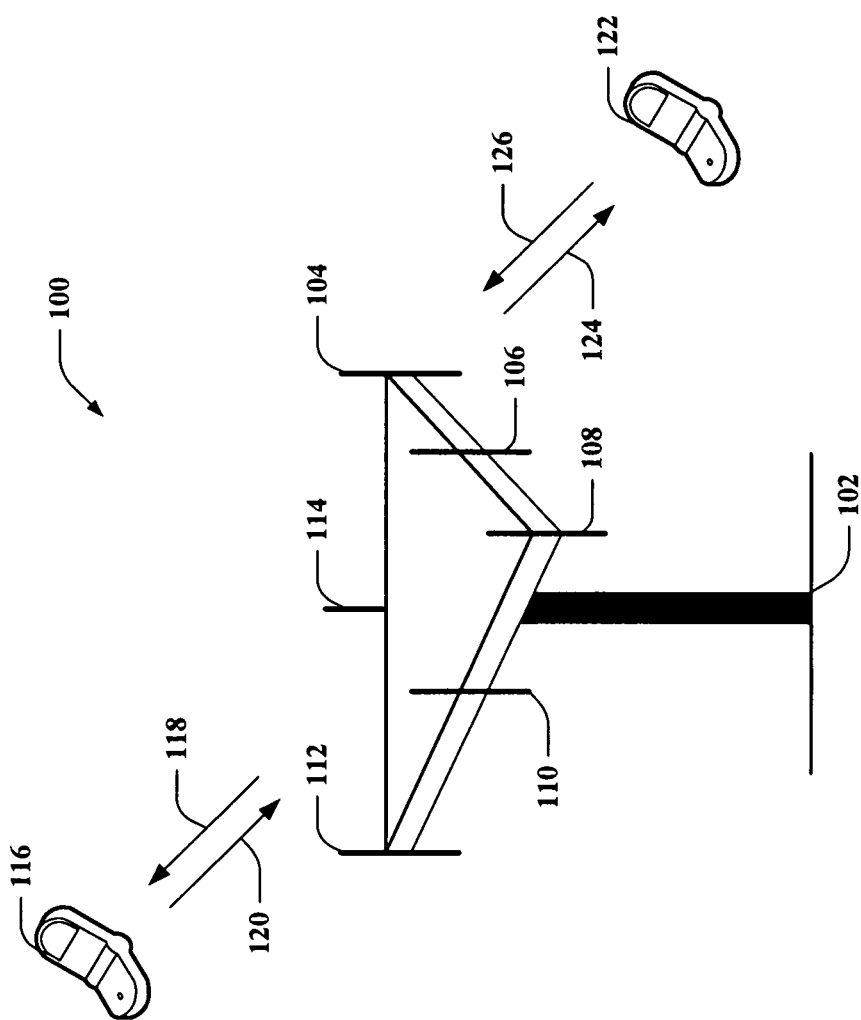
FIG. 1 is an illustration of a wireless communication system in accordance with various aspects set forth herein.

Various embodiments are now described with reference to the drawings, wherein like reference numerals are used to refer to like elements throughout. In the following description, for purposes of explanation, numerous specific details are set forth in order to provide a thorough understanding of one or more embodiments. It may be evident, however, that such embodiment(s) may be practiced without these specific details. In other instances, well-known structures and devices are shown in block diagram form in order to facilitate describing one or more embodiments.

As used in this application, the terms "component," "module," "system," and the like are intended to refer to a computer-related entity, either hardware, firmware, a combination of hardware and software, software, or software in execution. For example, a component can be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets (e.g., data from one component interacting with another component in a local system, distributed system, and/or across a network such as the Internet with other systems by way of the signal).

The techniques described herein can be used for various wireless communication systems such as code division multiple access (CDMA), time division multiple access (TDMA), frequency division multiple access (FDMA), orthogonal frequency division multiple access (OFDMA), single carrier-frequency division multiple access (SC-FDMA) and other systems. The terms "system" and "network" are often used interchangeably. A CDMA system can implement a radio technology such as Universal Terrestrial Radio Access (UTRA), CDMA2000, etc. UTRA includes Wideband-CDMA (W-CDMA) and other variants of CDMA. CDMA2000 covers IS-2000, IS-95 and IS-856 standards. A TDMA system can implement a radio technology such as Global System for Mobile Communications (GSM). An OFDMA system can implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). 3GPP Long Term Evolution (LTE) is an upcoming release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). Additionally, CDMA2000 and UMB are described in documents from an organization named "3rd Generation Partnership Project 2" (3GPP2). Further, such wireless communication systems can additionally include peer-to-peer (e.g., mobile-to-mobile) ad hoc network systems often using unpaired unlicensed spectrums, 802.xx wireless LAN, BLUETOOTH and any other short- or long-range, wireless communication techniques.

Single carrier frequency division multiple access (SC-FDMA) utilizes single carrier modulation and frequency domain equalization. SC-FDMA has similar performance and essentially the same overall complexity as those of an OFDMA system. A SC-FDMA signal has lower peak-to-average power ratio (PAPR) because of its inherent single carrier structure. SC-FDMA can be used, for instance, in uplink communications where lower PAPR greatly benefits access terminals in terms of transmit power efficiency. Accordingly, SC-FDMA can be implemented as an uplink multiple access scheme in 3GPP Long Term Evolution (LTE) or Evolved UTRA.

Furthermore, various embodiments are described herein in connection with an access terminal. An access terminal can also be called a system, subscriber unit, subscriber station, mobile station, mobile, remote station, remote terminal, mobile device, user terminal, terminal, wireless communication device, user agent, user device, or user equipment (UE). An access terminal can be a cellular telephone, a cordless telephone, a Session Initiation Protocol (SIP) phone, a wireless local loop (WLL) station, a personal digital assistant (PDA), a handheld device having wireless connection capability, computing device, or other processing device connected to a wireless modem. Moreover, various embodiments are described herein in connection with a base station. A base station can be utilized for communicating with access terminal(s) and can also be referred to as an access point, Node B, Evolved Node B (eNodeB, eNB) or some other terminology.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Various aspects or features described herein can be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., EPROM, card, stick, key drive, etc.). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data.

Referring now to FIG. 1, a wireless communication system 100 is illustrated in accordance with various embodiments presented herein. System 100 comprises a base station 102 that can include multiple antenna groups. For example, one antenna group can include antennas 104 and 106, another group can comprise antennas 108 and 110, and an additional group can include antennas 112 and 114. Two antennas are illustrated for each antenna group; however, more or fewer antennas can be utilized for each group. Base station 102 can additionally include a transmitter chain and a receiver chain, each of which can in turn comprise a plurality of components associated with signal transmission and reception (e.g., processors, modulators, multiplexers, demodulators, demultiplexers, antennas, etc.), as will be appreciated by one skilled in the art.

Base station 102 can communicate with one or more access terminals such as access terminal 116 and access terminal 122; however, it is to be appreciated that base station 102 can communicate with substantially any number of access terminals similar to access terminals 116 and 122. Access terminals 116 and 122 can be, for example, cellular phones, smart phones, laptops, handheld communication devices, handheld computing devices, satellite radios, global positioning systems, PDAs, and/or any other suitable device for communicating over wireless communication system 100. As depicted, access terminal 116 is in communication with antennas 112 and 114, where antennas 112 and 114 transmit information to access terminal 116 over a forward link 118 and receive information from access terminal 116 over a reverse link 120. Moreover, access terminal 122 is in communication with antennas 104 and 106, where antennas 104 and 106 transmit information to access terminal 122 over a forward link 124 and receive information from access terminal 122 over a reverse link 126. In a frequency division duplex (FDD) system, forward link 118 can utilize a different frequency band than that used by reverse link 120, and forward link 124 can employ a different frequency band than that employed by reverse link 126, for example. Further, in a time division duplex (TDD) system, forward link 118 and reverse link 120 can utilize a common frequency band and forward link 124 and reverse link 126 can utilize a common frequency band.

Each group of antennas and/or the area in which they are designated to communicate can be referred to as a sector of base station 102. For example, antenna groups can be designed to communicate to access terminals in a sector of the areas covered by base station 102. In communication over forward links 118 and 124, the transmitting antennas of base station 102 can utilize beamforming to improve signal-to-noise ratio of forward links 118 and 124 for access terminals 116 and 122. Also, while base station 102 utilizes beamforming to transmit to access terminals 116 and 122 scattered randomly through an associated coverage, access terminals in neighboring cells can be subject to less interference as compared to a base station transmitting through a single antenna to all its access terminals.

System 100 supports signaling Physical Hybrid Automatic Repeat Request (HARQ) Indicator Channel (PHICH) resource assignments for multiple Transmission Time Intervals (TTIs). The plurality of PHICH resource assignments can be signaled by base station 102 in a broadcast channel to access terminals 116, 122. By way of example, the broadcast channel used to carry the PHICH resource assignments can be a Physical Broadcast Channel (PBCH).

PHICH resource assignments for a current Transmission Time Interval (TTI) and a subsequent TTI can be signaled in PBCH by base station 102. Accordingly, access terminal 116, 122 can decode PBCH to identify the PHICH resource assignment for the current TTI as well as the PHICH resource assignment for the subsequent TTI. The current TTI is a TTI during which the PBCH transmission including the PHICH resource assignments is transmitted by base station 102. Further, the subsequent TTI can be any TTI occurring later in time in comparison to the current TTI. Pursuant to an example, the subsequent TTI can be a next TTI (e.g., immediately after the current TTI, . . . ). By way of further illustration, the subsequent TTI can be any other later occurring TTI. It is to be appreciated that base station 102 and access terminals 116, 122 can employ any predefined function for recognizing the subsequent TTI based upon the current TTI (e.g., the predefined function utilized by both base station 102 and access terminals 116, 122 can identify the subsequent TTI as being the Xth TTI after the current TTI, where X can be substantially any integer, . . . ).

By transmitting information related to PHICH resource assignments for both a current TTI and a subsequent TTI, system 100 mitigates deficiencies commonly encountered when employing conventional techniques. In particular, common approaches oftentimes leverage blind decoding by access terminals, where decoding can be effectuated by assuming substantially all possible PHICH resource assignments. Moreover, other conventional approaches include signaling a PHICH resource assignment related to one TTI; however, these approaches are unclear whether the signaled PHICH resource assignment corresponds to a current TTI or a subsequent TTI. Thus, when the PHICH resource assignment varies between the current TTI and the subsequent TTI, it can be unclear whether the signaled PHICH resource assignment pertains to the current TTI or the subsequent TTI.

For instance, if a base station employing a conventional technique transmits a PHICH resource assignment related to a current TTI (e.g., which was altered from a PHICH resource assignment for an immediately prior TTI, . . . ) without information pertaining to a next TTI, then an access terminal with a low geometry may decode the broadcast channel to identify the PHICH resource assignment towards the end of the current TTI to which the decoded PHICH resource assignment pertains. Moreover, a next TTI can use a differing PHICH resource assignment as compared to the current TTI. Accordingly, the access terminal can be unaware of the PHICH resource assignment during most of the current TTI (e.g., prior to decoding the broadcast channel, . . . ), and since the PHICH resource assignment can be changed for the next TTI, the unawareness of the PHICH resource assignment can repeat for the next TTI.

By way of another example, if a common approach is leveraged where a base station sends, during a current TTI, a PHICH resource assignment pertaining to a next TTI, then an access terminal with high geometry can decode the broadcast channel towards the beginning of the current TTI. However, the PHICH resource assignment decoded by the access terminal during the current TTI can be applicable to a next TTI. Thus, the access terminal can be delayed before being able to utilize the decoded PHICH resource assignment.

Figure 2:
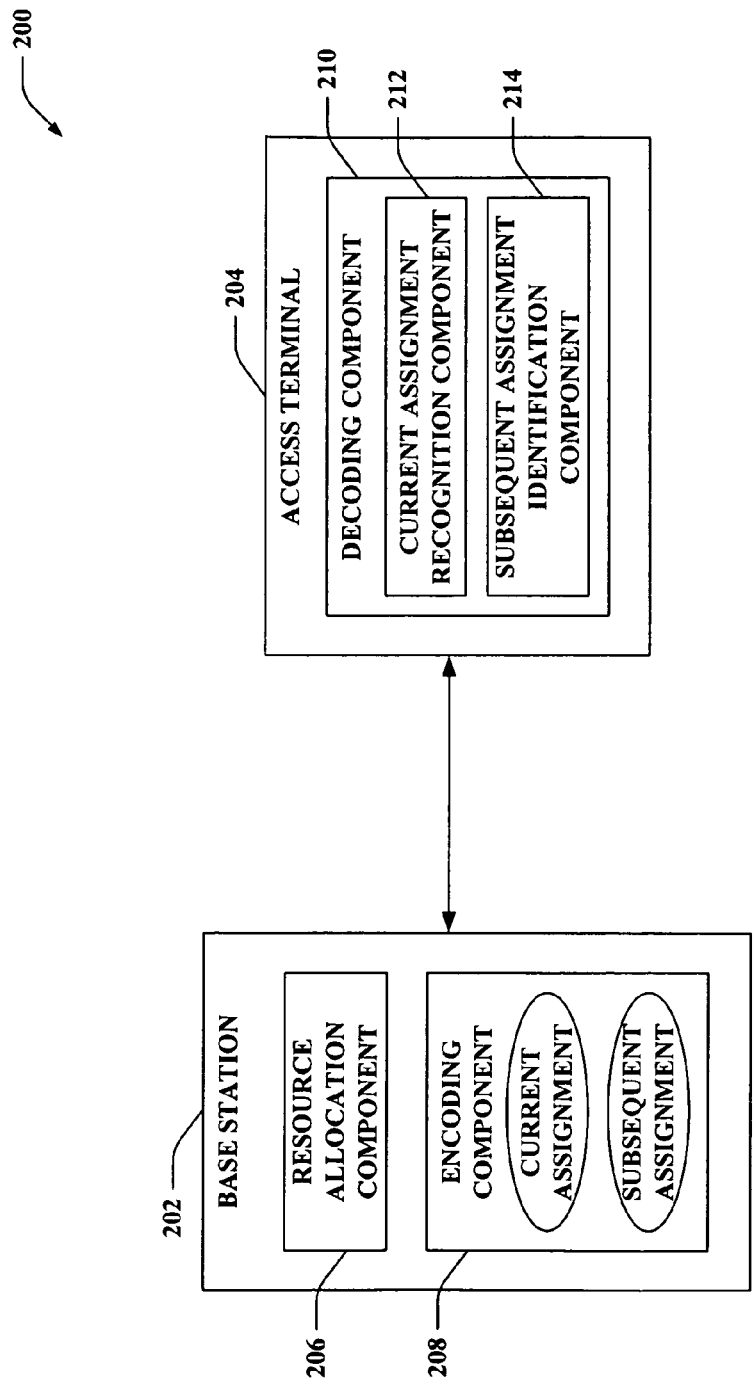
FIG. 2 is an illustration of an example system that signals PHICH resource usage in a wireless communication environment.

Now referring to FIG. 2, illustrated is a system 200 that signals PHICH resource usage in a wireless communication environment. System 200 includes a base station 202 that can transmit and/or receive information, signals, data, instructions, commands, bits, symbols, and the like. Base station 202 can communicate with an access terminal 204 via the forward link and/or reverse link. Access terminal 204 can transmit and/or receive information, signals, data, instructions, commands, bits, symbols, and the like. Moreover, although not shown, it is contemplated that any number of base stations similar to base station 202 can be included in system 200 and/or any number of access terminals similar to access terminal 204 can be included in system 200. According to an illustration, system 200 can be a Long Term Evolution (LTE) based system; however, the claimed subject matter is not so limited.

Base station 202 can include a resource allocation component 206 that can generate a PHICH resource assignment. The PHICH resource assignment can include duration and resource usage. The duration of PHICH is a number of OFDM symbols used for PHICH. For example, the duration set by resource allocation component 206 can be one OFDM symbol or three OFDM symbols; however, the claimed subject matter is not limited to the foregoing example. According to another example, resource allocation component 206 can select one of four possible PHICH resource usage values: ⅙, ½, 1, or 2. It is to be appreciated that the claimed subject matter is not so limited. Further, resource allocation component 206 can set a current PHICH resource assignment for a current TTI and a subsequent PHICH resource assignment for a subsequent TTI.

PHICH can be utilized to provide Acknowledgment/Negative Acknowledgment (ACK/NAK) for Uplink Shared Channel (UL-SCH) transmissions (e.g., UL-SCH can carry multiplexed signaling and traffic, . . . ). Depending on the duration allotted by resource allocation component 206, one OFDM symbol can be used for PHICH (e.g., PHICH can be transmitted in time on a first OFDM symbol in a subframe, normal duration, . . . ) or three OFDM symbols can be utilized for PHICH (e.g., PHICH can be transmitted in time over three OFDM symbols, extended duration, . . . ). Further, the resource usage yielded by resource allocation component 206 can control resources used for PHICH. Moreover, PHICH can be FDM multiplexed with other downlink control channels (e.g., Physical Downlink Control Channel (PDCCH), Physical Control Format Indicator Channel (PCFICH), . . . ).

Further, base station 202 can include an encoding component 208 that encodes PHICH resource assignments yielded by resource allocation component 206. Encoding component 208 can encode a current PHICH resource assignment and a subsequent PHICH resource assignment. Moreover, the encoded PHICH resource assignments generated by encoding component 208 can be signaled via a broadcast channel (e.g., PBCH, . . . ) to access terminal 204.

PBCH can be used to broadcast system information including the encoded PHICH resource assignments. PBCH can carry a Primary Broadcast Channel (P-BCH) transport channel. PBCH can be transmitted in time during subframe 0 of radio-frames. Further, within each subframe 0, four OFDM symbols can be used for PBCH. Moreover, a frequency employed for PBCH can be a middle 1.08 MHz (e.g., 6 Resource Blocks (RBs), . . . ). PBCH can be transmitted in four bursts at a low data rate within a Transmission Time Interval (TTI) (e.g., a TTI can be 40 ms, however any length TTI is intended to fall within the scope of the heretoappended claims, . . . ). Each burst can be self-decodable and a Cyclic Redundancy Check (CRC) can uniquely determine a PBCH TTI boundary. It is to be appreciated, however, that the foregoing discussion of PBCH is presented for illustration purposes, and the claimed subject matter is not so limited.

Access terminal 204 can include a decoding component 210 that can evaluate information obtained via the broadcast channel (e.g., PBCH, . . . ) from base station 202. Decoding component 210 can further include a current assignment recognition component 212 and a subsequent assignment identification component 214. Current assignment recognition component 212 can decipher the received broadcast channel information to yield the current PHICH resource assignment corresponding to a current TTI. Moreover, subsequent assignment identification component 214 can decode the received broadcast channel information to yield the subsequent PHICH resource assignment pertaining to a subsequent TTI.

Encoding component 208 can encode PHICH resource assignments for both a current TTI and a subsequent TTI for signaling through PBCH, and decoding component 210 decipher the current PHICH resource assignment pertaining to the current TTI (e.g., using current assignment recognition component 212, . . . ) and the subsequent PHICH resource assignment corresponding to the subsequent TTI (e.g., utilizing subsequent assignment identification component 214, . . . ). Although many of the illustrations presented herein relate to signaling the encoded PHICH resource assignments through PBCH, it is also contemplated that encoding component 208 can encode PHICH resource assignments for both a current TTI and a subsequent TTI for transmission through dedicated Radio Resource Control (RRC) signaling during handover. Moreover, decoding component 212 (e.g., leveraging current assignment recognition component 212 and subsequent assignment identification component 214, . . . ) can decode the current PHICH resource assignment related to the current TTI and the subsequent PHICH resource assignment pertaining to the subsequent TTI from the dedicated RRC signaling received during handover.

Conventional techniques oftentimes employ three bits for signaling a PHICH resource assignment. More particularly, one bit can indicate a duration of PHICH (e.g., one OFDM symbol or three OFDM symbols, . . . ) and two bits can identify one of four possible PHICH resource allocations. Thus, a PHICH resource assignment pertaining to one TTI can be signaled with conventional techniques. However, these common approaches typically result in excess system acquisition time, multiple attempts of decoding PBCH over different TTIs, increased delay for an access terminal in Discontinuous Reception (DRX) mode, and the like.

According to an example, system 200 can support using six bits (e.g., in PBCH, ... ) to signal PHICH resource assignments for the current TTI and the subsequent TTI. Following this example, PHICH duration can be signaled using two of the six bits, and the remaining four bits can be employed to indicate PHICH resource usage. From the two bits used for signaling the PHICH duration, one bit can be used for indicating the duration for the current TTI and the other bit can be utilized for identifying the duration for the subsequent TTI. Moreover, the four bits used for indicating the PHICH resource usage can include two bits employed for signaling the PHICH resource usage for the current TTI and two bits utilized for signaling the PHICH resource usage for the subsequent TTI. According to another illustration, PHICH resource usage transitions across TTIs can be limited such that a fewer number of bits can be utilized (e.g., less than four bits can be used to signal the PHICH resource usage, ... ). Pursuant to a further example, a look-up table can be used to indicate possible combinations of PHICH resource usage across TTIs.

By way of another example, the current PHICH resource assignment corresponding to the current TTI and the subsequent PHICH resource assignment pertaining to the subsequent TTI can be signaled using four bits (e.g., in PBCH, ... ) and a CRC mask (e.g., which can be applied to CRC portion of PBCH, ... ). Pursuant to this example, two of the four bits can be used to signal PHICH duration, including one bit for the PHICH duration associated with the current TTI and one bit for the PHICH duration associated with the subsequent TTI. Moreover, the remaining two bits can be utilized to indicate the PHICH resource usage for either the current TTI or the subsequent TTI. Further, the PHICH resource usage for the other TTI (e.g., not signaled using the two bits of PBCH, ... ) can be indicated based upon a selection of a CRC mask from a set of possible CRC masks. For instance, N different CRC masks can be defined (e.g., included in the set of possible CRC masks, ... ), where N can be substantially any integer. By way of illustration, N can be four; however, the claimed subject matter is not so limited. Each of the N different CRC masks can map to one of N PHICH resource usage values, yet, it is contemplated that other mappings are intended to fall within the scope of the heretoappended claims.

The following depicts an example scenario employing a selected CRC mask to convey information related to PHICH resource assignments. CRC can be calculated for a transport block of PBCH. Further, the selected CRC mask corresponding to the PHICH resource usage value to be signaled can be applied to the CRC portion of PBCH (e.g., employing an XOR operation, ... ). The selected CRC mask can be in addition to a CRC mask related to a number of transmit antennas; yet, the claimed subject matter is not so limited. Thus, information carried by the selected CRC mask can be used to indicate the PHICH resource usage for either the current TTI or the subsequent TTI (e.g., while the PHICH resource usage for the other TTI can be signaled using two bits in the payload of PBCH, ... ).

According to a further example, the PHICH resource assignments for the current and subsequent TTI can be signaled employing four bits (e.g., in the payload of PBCH, ... ). Following this example, two of the four bits can be used for indicating duration of PHICH, including one bit that can indicate the PHICH duration for the current TTI and one bit that can identify the PHICH duration for the subsequent TTI. Additionally, the remaining two bits can indicate the PHICH resource usage for the subsequent TTI. Thus, access terminal 204 can assume that the PHICH resource usage allocation remains unchanged (e.g., base station 202 can infrequently change the PHICH resource usage allocation when employing such scheme, ... ).

Figure 3:
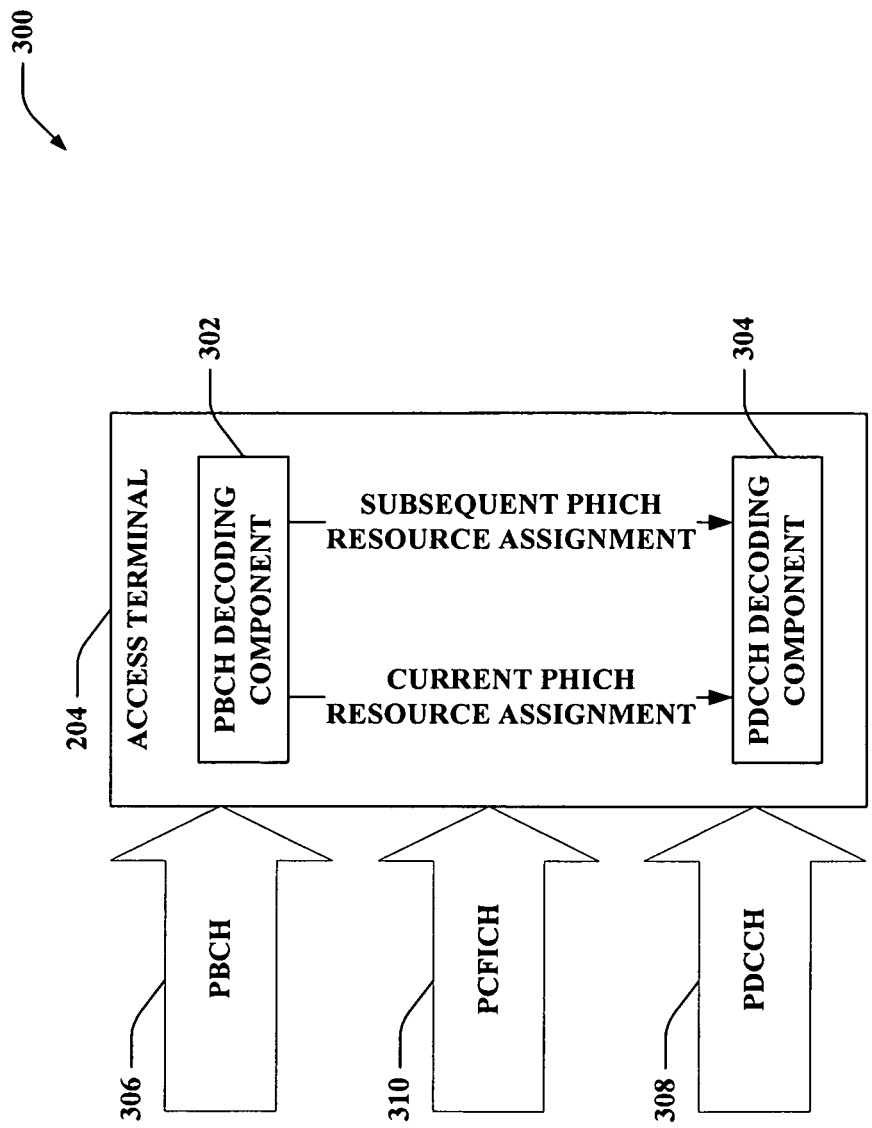
FIG. 3 is an illustration of an example system that identifies information concerning PHICH resource assignments to decode a downlink control channel.

Now referring to FIG. 3, illustrated is a system 300 that identifies information concerning PHICH resource assignments to decode a downlink control channel. System 300 includes access terminal 204, which can further include a PBCH decoding component 302 and a PDCCH decoding component 304. Although not shown, it is contemplated that decoding component 210 of FIG. 2 can include PBCH decoding component 302 and/or PDCCH decoding component 304.

PBCH decoding component 302 can decipher PBCH 306 to identify a current PHICH resource assignment corresponding to a current TTI and a subsequent PHICH resource assignment corresponding to a subsequent TTI as described herein. Further, PDCCH decoding component 304 can enable decoding a Physical Downlink Control Channel (PDCCH) 308. Access terminal 204 can decode PDCCH 308 to identify resources assigned thereto. Further, access terminal 204 can use the resource assignment identified by PDCCH decoding component 304 to decode a data channel such as, for instance, a Downlink Shared Channel (DL-SCH).

To decode PDCCH 308, PDCCH decoding component 304 can receive information concerning a number of symbols allocated for PDCCH 308 in each subframe (e.g., 1 ms, ... ). Such information can be indicated using a Physical Control Format Indicator Channel (PCFICH) 310. PCFICH 310 can be utilized for signaling the PDCCH control region. For instance, PCFICH 310 can signal whether one, two, or three OFDM symbols are used for PDCCH 308; yet, the claimed subject matter is not so limited. Moreover, PCFICH 310 can be transmitted in time during a first OFDM symbol of each subframe. Further, the frequency of PCFICH 310 can span a system band, and a mapping can depend on a cell identifier (ID). Accordingly, location and resource assignment used for PCFICH 310 can be determined by PDCCH decoding component 304 (or access terminal 204 generally) as a function of cell ID.

Moreover, PDCCH decoding component 304 can obtain the current PHICH resource assignment and the subsequent PHICH resource assignment from PBCH decoding component 302. PDCCH decoding component 304 can discount resources used for PHICH and PCFICH 310 to recognize resources/control channel elements (CCEs) used for PDCCH 308.

PDCCH 308, for instance, can carry downlink and/or uplink resource assignments, multi-user Transmit Power Control (TPC) commands, paging indicators, and so forth to access terminal 204. Further, PDCCH decoding component 304 can recognize a particular format utilized for PDCCH 308. By way of illustration, one to three OFDM symbols can be used in a subframe depending upon the particular format employed with PDCCH 308. Moreover, PCFICH 310 can use the first OFDM symbol of each subframe and four mini CCEs to inform PDCCH decoding component 304 as to the particular format for PDCCH 308.

Moreover, TDD systems can utilize blind decoding of a common PDCCH. The amount of PHICH resources can vary between downlink subframes and can be one of 0, M or 2M, where M is an amount of PHICH resources indicated in a substantially similar manner as compared to the way FDD can use PBCH. For instance, the resource usage can depend on uplink/downlink allocation. To reduce complexity, Primary Broadcast Channel (P-BCH)/Dynamic Broadcast Channel (DBCH) content can be unchanged (e.g., three bits of information about TDD uplink/downlink allocation can be transmitted in System Information Block Type 1 (SI-1), . . . ). Further, blind detection of PDCCH can be employed to decode SI-1 in subframe 5. To reduce a number of blind decoding attempts, a position of PDCCH can be restricted for scheduling a Scheduling Unit 1 (SU-1) on the common search space. Moreover, PDCCH for scheduling the SI-1 can be allocated to a first CCE set of each aggregation of common search space in subframe 5 (e.g., resulting in three or six blind decoding attempts in the TDD case, . . . ).

Figure 4:
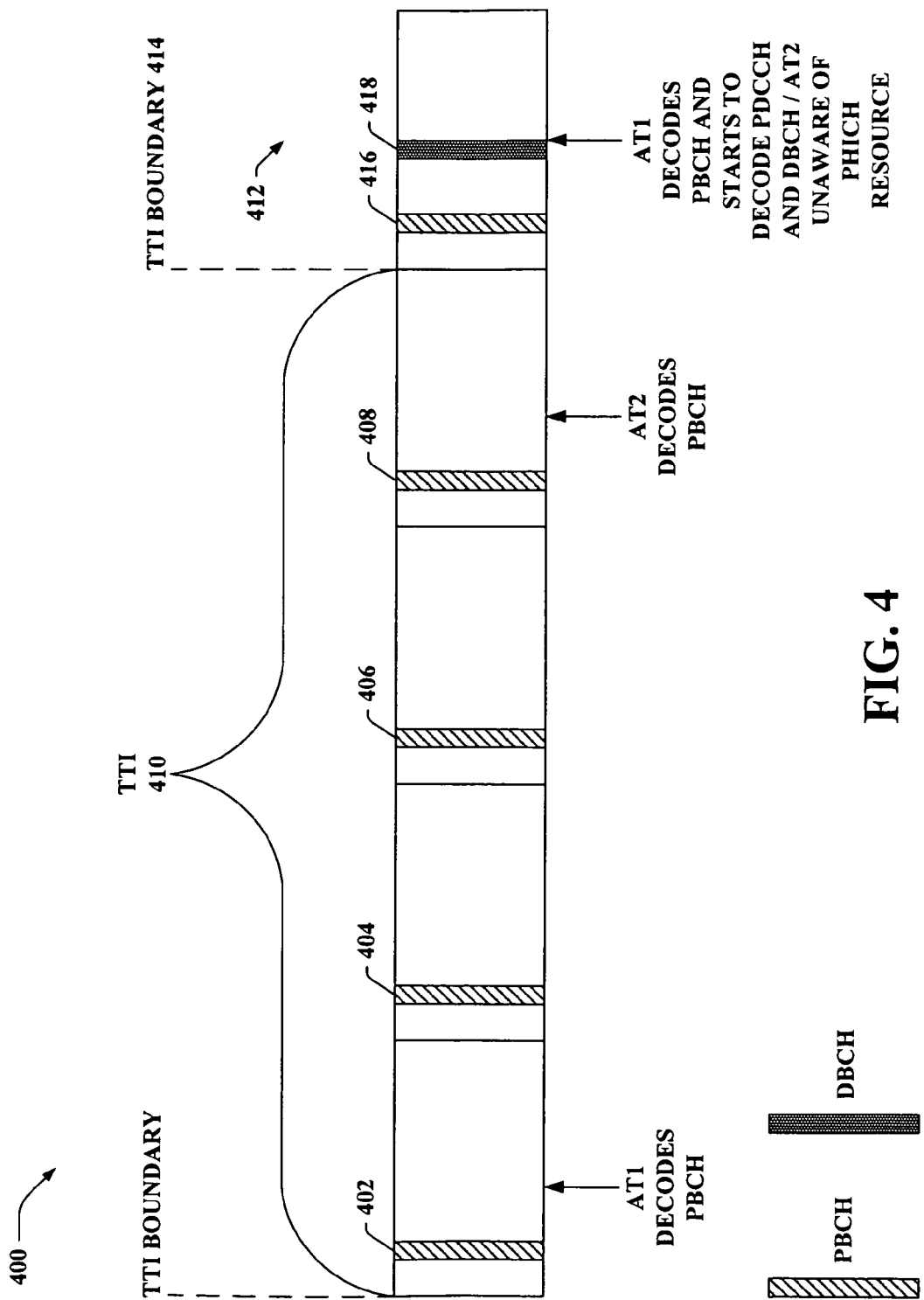
FIGS. 4-6 illustrate various example timelines depicting deficiencies commonly encountered in connection with conventional techniques for indicating PHICH resource assignments in a wireless communication environment.
Figure 5:
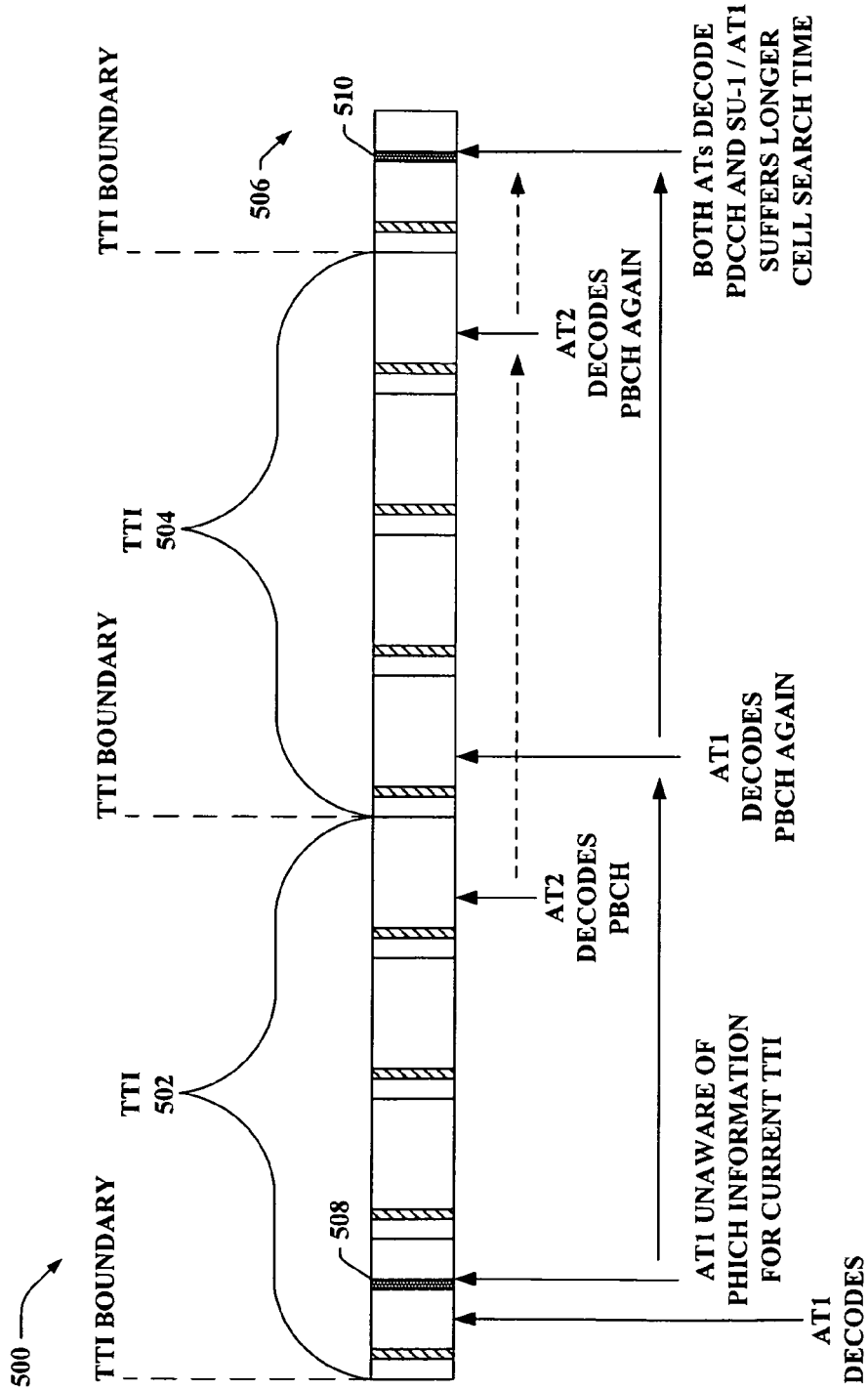
Figure 6:
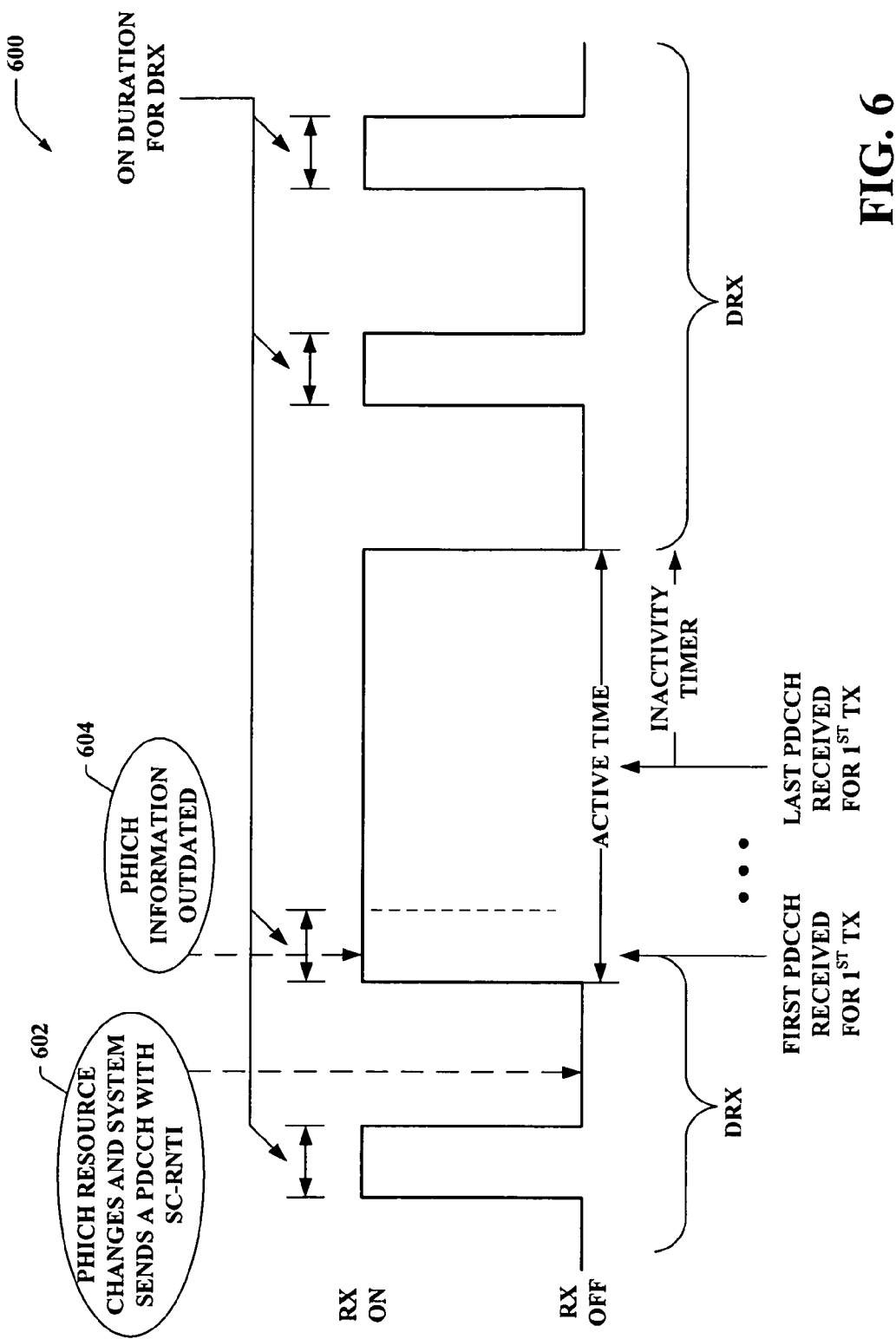

Turning to FIGS. 4-6, illustrated are various example timelines depicting deficiencies commonly encountered in connection with conventional techniques for indicating PHICH resource assignments in a wireless communication environment. It is contemplated that PHICH resource assignments can change over time. For instance, the minimum PHICH resource assignment change period can be a TTI associated with PBCH. By way of example, the PBCH TTI can be 40 ms; yet, any length TTI is intended to fall within the scope of the hereto appended claims. Assuming the PBCH TTI to be 40 ms, at a minimum, the PHICH resource assignment can be altered every 40 ms; however, the claimed subject matter is not so limited. The example timelines illustrated in FIGS. 4-6 show various deficiencies that can be encountered when conventional approaches for providing PHICH resource assignment information are leveraged; yet, it is to be appreciated that the claimed subject matter is not to be limited by these examples.

For access terminals to know that system information changes in PBCH have occurred, paging messages can be utilized to inform access terminals in an RRC_Idle mode. Thereafter, the access terminals can re-decode PBCH. Moreover, for access terminals in RRC_Connected mode, a particular PBCCH with a Single Carrier Radio Network Temporary Identifier (SC-RNTI) can be used to signal system information change (e.g., any system information including a Master Information Block (MIB), a System Information Block Type 1 (SI-1), a System Information Block Type x (SI-x), . . . ). This particular PDCCH with SC-RNTI can be sent at a periodic occasion. Thus, the access terminals can re-decode PBCH because a change in system information has been indicated.

Conventional techniques typically signal PHICH resource assignment information for one TTI. For instance, three bits in PBCH can be used to signal the PHICH resource assignment for one TTI. However, it can be unclear whether the three bits are intended for providing information related to the PHICH resource assignment for a current TTI or the PHICH resource assignment for a subsequent TTI.

Referring to FIG. 4, illustrated is an example timing diagram 400 that depicts signaling a current PHICH resource assignment pertaining to a current TTI without a subsequent PHICH resource assignment related to a subsequent TTI. By way of illustration, PBCH bursts 402, 404, 406, and 408 included in TTI 410 can each include three bits pertaining to the PHICH resource assignment for TTI 410 (e.g., each PBCH burst 402-408 can include the current PHICH resource assignment corresponding to the current TTI, . . . ). Since each PBCH burst 402-408 can be sent on a second slot of a first subframe in a radio frame, the three bits can be intended for subframes after the first subframe. For initial acquisition or after an access terminal awakes from DRX mode, an access terminal can decode PBCH bursts 402-408 to know the PHICH resource assignment for TTI 410 such that it can decode PDCCH and a Physical Downlink Shared Channel (PDSCH). Moreover, the PHICH resource assignment can be changed for utilization during a next TTI 412 (e.g., subsequent TTI, . . . ) after TTI boundary 414. Further, PBCH bursts included in TTI 412 (e.g., PBCH burst 416, disparate PBCH bursts (not depicted), . . . ) can each include three bits pertaining to the subsequent PHICH resource assignment for subsequent TTI (e.g., TTI 412, . . . ).

Disparate access terminals can decode PBCH at disparate times. For instance, a high geometry access terminal (e.g., AT1, high signal to noise ratio (SNR), . . . ) can decode PBCH early during TTI 410 (e.g., PBCH burst 402, . . . ). The high geometry access terminal, however, may need to wait another 40 ms if a Dynamic Broadcast Channel (DBCH) 418 is sent during a next TTI 412. In such case, the high geometry access terminal can decode PBCH again (e.g., PBCH burst 416, . . . ) when the PHICH resource assignment changes over TTI boundary 414. For instance, the high geometry access terminal can decode PDCCH and DBCH 418 using the PHICH resource assignment pertaining to TTI 412 yielded from decoding PBCH burst 416.

Moreover, a low geometry access terminal (e.g., AT2, low SNR, . . . ) can be slower to decode PBCH; for example, the low geometry access terminal can decode PBCH later within TTI 410 (e.g., PBCH burst 408, . . . ). When the low geometry access terminal decodes PBCH towards the end of TTI 410, and PBCH provides the PHICH resource assignment for TTI 410, then this access terminal is provided with PHICH resource assignment information for an earlier period of time prior to decoding of PBCH (e.g., about 40 ms if the PHICH resource assignment changed at the TTI boundary at the beginning of TTI 410, . . . ). Thus, such access terminal can be unaware of the PHICH resource assignment for TTI 410 and can need to decode PBCH again during TTI 412. Accordingly, the unawareness can repeat for the low geometry access terminal during TTI 412 and beyond. By way of example, the low geometry access terminal can be unaware of the PHICH resource assignment for TTI 412 when DBCH 418 is received (e.g., since such access terminal can be unable to decode PBCH burst 416 and the decoded PHICH resource assignment information from PBCH burst 408 can be outdated, . . . ), and hence, can be unable to decode DBCH 418.

Turning to FIG. 5, illustrated is an example timing diagram 500 that depicts signaling a next PHICH resource assignment (e.g., subsequent PHICH resource assignment, . . . ) corresponding to a next TTI (e.g., subsequent TTI, . . . ) without a current PHICH resource assignment pertaining to a current TTI. According to this example, PBCH bursts included in TTI 502 can include PHICH resource assignment information pertaining to TTI 504 (e.g., next TTI, . . . ). Similarly, PBCH bursts included in TTI 504 can include PHICH resource assignment information related to TTI 506 (e.g., next TTI, . . . ).

Pursuant to the example depicted in timing diagram 500, three bits included in PBCH can correspond to a PHICH resource assignment for a next TTI. For an access terminal with high geometry (e.g., AT1, . . . ), PBCH can be decoded during a first 10 ms of a TTI (e.g., first 10 ms of TTI 502, . . . ). Further, for instance, DBCH 508 (e.g., SI-1, . . . ) can be sent in the same radio frame as when PBCH is decoded. Yet, the high geometry access terminal can be unaware of PHICH resource assignment information for TTI 502. Accordingly, the high geometry access terminal can be unable to decode DBCH 508, and instead can wait approximately 80 ms to start decoding SI-1 (e.g., DBCH 510, . . . ), since SI-1 can be mapped to DL-SCH and PDCCH can need to be decoded to decode PDSCH (e.g., unless the access terminal tried blind decoding in a common search space by assuming all possible PHICH resource assignment, . . . ). Both the high geometry access terminal and a low geometry access terminal (e.g., AT2, . . . ) can decode DBCH 510 using PHICH resource assignment information obtained during TTI 504 pertaining to TTI 506. Thus, the high geometry access terminal can suffer longer cell search time as compared to techniques described herein where both PHICH resource assignments pertaining to a current TTI and a subsequent TTI are signaled together.

FIG. 6 illustrates an example timing diagram 600 that depicts an impact of conventional PHICH resource signaling on an access terminal when using DRX mode. If a PHICH resource assignment changes and a PDCCH with SC-RNTI is sent when the access terminal is in an RX Off period at 602, then the access terminal has outdated PHICH resource assignment information at the time of waking up at 604. Thus, the access terminal can need to decode PBCH upon awakening. With conventional approaches, if the three bits for PHICH resource assignment information in PBCH correspond to a next TTI, then the access terminal can have around a 10 ms to 30 ms delay before it can decode PDCCHs. Moreover, in accordance with conventional techniques, if the three bits for the PHICH resource assignment in PBCH relate to a current TTI, then it is possible that a low geometry access terminal can be unable to obtain on-time PHICH resource assignment information.

Further, conventional approaches can detrimentally impact access terminals during handover. For instance, during handover, dedicated (RRC) signaling can be used to signal PHICH duration and resource usage (e.g., three bits of information can be leveraged, . . . ). Unless a base station schedules the dedicated RRC carefully, the access terminal can encounter a delay of 10 ms to 40 ms to start decoding PDCCH (e.g., regardless whether the three bits are for the current 40 ms TTI or the next 40 ms TTI, . . . ).

As described herein, conventional approaches for PHICH resource assignment signaling oftentimes encounter various deficiencies. For instance, excess system acquisition time on decoding DBCH (e.g., SU-1, . . . ) can result when blind decoding of a PHICH resource assignment is not used. Further, blind decoding of PHICH resource assignments can increase complexity of decoding a common search space. Moreover, a number of PBCH decoding attempts over different TTIs can result from conventional techniques. Further, increased delay for access terminals in DRX mode can result from using common approaches. The aforementioned can be mitigated by employing the techniques described herein.

Figure 7:
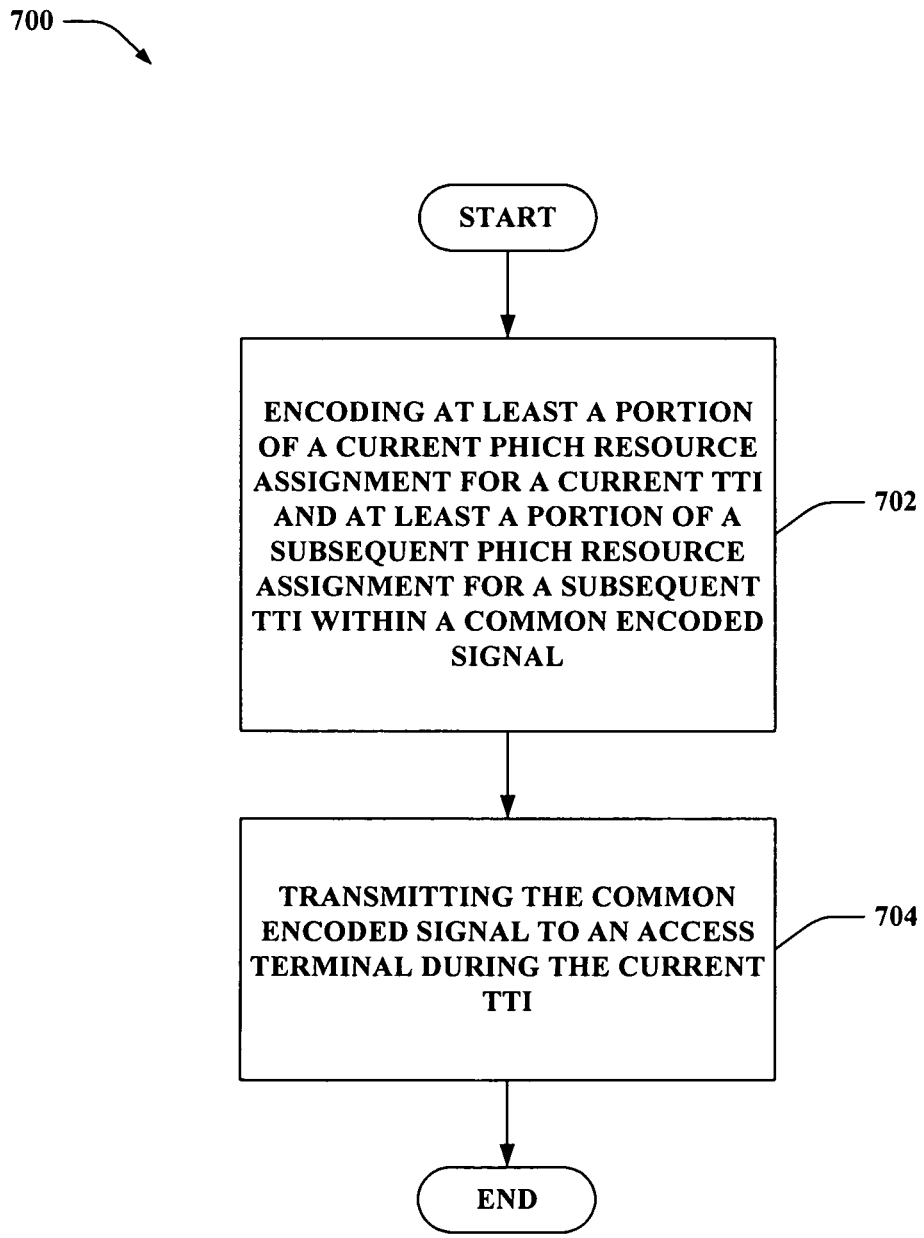
FIG. 7 is an illustration of an example methodology that facilitates disseminating Physical Hybrid Automatic Repeat Request (HARQ) Indicator Channel (PHICH) resource assignments in a wireless communication environment.
Figure 8:
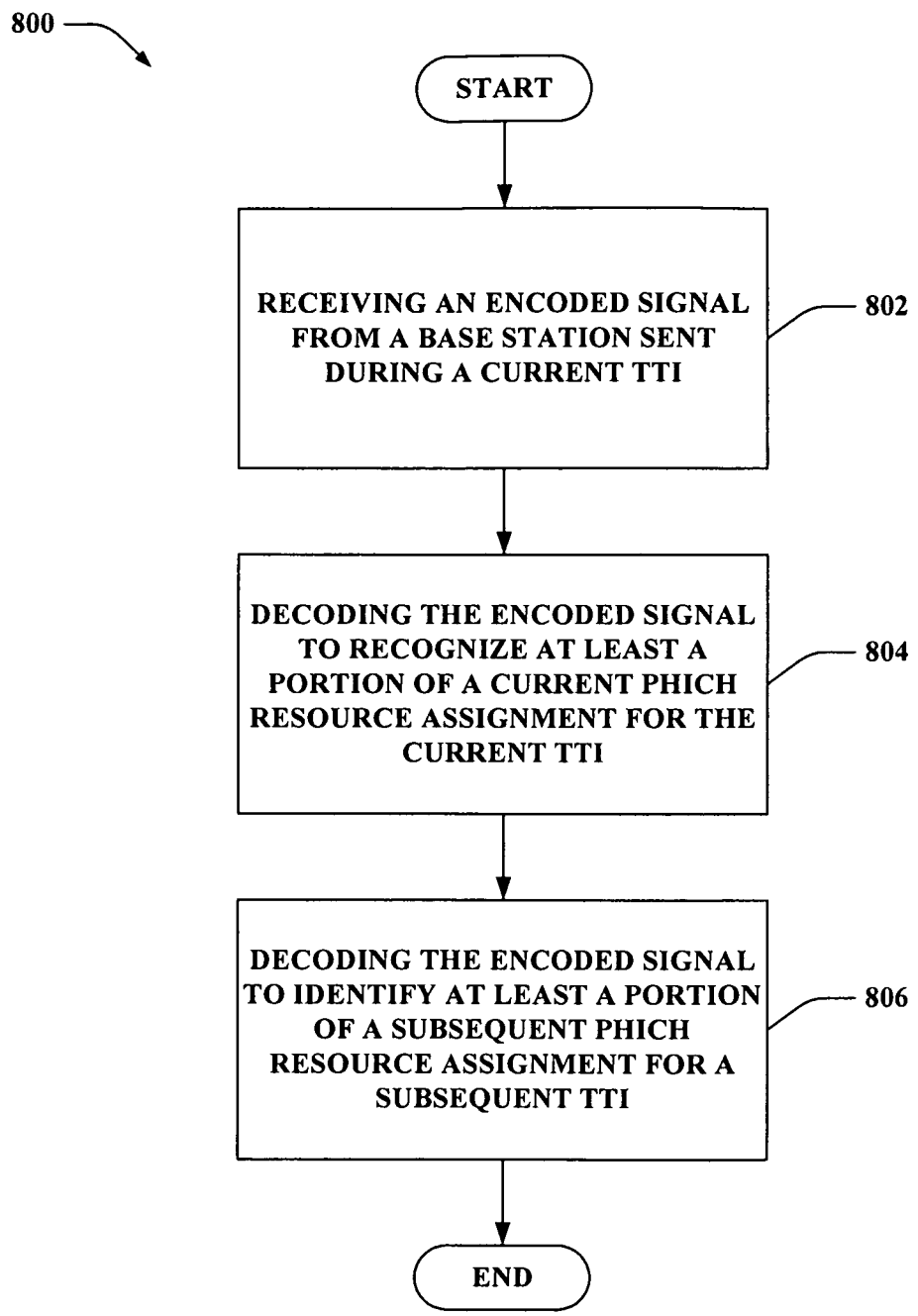
FIG. 8 is an illustration of an example methodology that facilitates obtaining signaled Physical Hybrid Automatic Repeat Request (HARQ) Indicator Channel (PHICH) resource assignments in a wireless communication environment.

Referring to FIGS. 7-8, methodologies relating to signaling PHICH resource assignments in a wireless communication environment are illustrated. While, for purposes of simplicity of explanation, the methodologies are shown and described as a series of acts, it is to be understood and appreciated that the methodologies are not limited by the order of acts, as some acts can, in accordance with one or more embodiments, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts can be required to implement a methodology in accordance with one or more embodiments.

With reference to FIG. 7, illustrated is a methodology 700 that facilitates disseminating Physical Hybrid Automatic Repeat Request (HARQ) Indicator Channel (PHICH) resource assignments in a wireless communication environment. At 702, at least a portion of a current PHICH resource assignment for a current Transmission Time Interval (TTI) and at least a portion of a subsequent PHICH resource assignment for a subsequent TTI can be encoded within a common encoded signal. The current PHICH resource assignment and the subsequent PHICH resource assignment can each include a respective PHICH duration and a respective PHICH resource usage. The PHICH duration is a number of Orthogonal Frequency Division Multiplexing (OFDM) symbols used for PHICH. For example, the PHICH duration can be either one OFDM symbol or three OFDM symbols. Further, the PHICH resource usage can identify resource elements used for PHICH. By way of example, the PHICH resource usage can be one of four possible values: ⅙, ½, 1, or 2. Moreover, the current PHICH resource assignment for the current TTI and the subsequent PHICH resource assignment for the subsequent TTI can be generated.

At 704, the common encoded signal can be transmitted to an access terminal during the current TTI. The common encoded signal, for instance, can be sent via a Physical Broadcast Channel (PBCH). According to another illustration, the common encoded signal can be transmitted through dedicated Radio Resource Control (RRC) signaling during handover. Further, the current TTI is a TTI during which the common encoded signal is transmitted, while the subsequent TTI is a TTI occurring later in time as compared to the current TTI. For example, the subsequent TTI can be a next TTI immediately after the current TTI. By way of another example, a predefined function shared with the access terminal can be employed to identify the subsequent TTI based upon the current TTI.

According to an example, the common encoded signal can include six bits related to the current PHICH resource assignment and the subsequent PHICH resource assignment. Following this example, a value of a first bit can be selected as a function of a PHICH duration assigned for the current TTI, and a value of a second bit can be chosen based upon a PHICH duration allocated for the subsequent TTI. Further, values for a third bit and a fourth bit can be selected as a function of a PHICH resource usage allotted for the current TTI, and values for a fifth bit and a sixth bit can be chosen based upon a PHICH resource usage assigned for the subsequent TTI.

Pursuant to another example, the common encoded signal can include four bits related to the current PHICH resource assignment and the subsequent PHICH resource assignment as well as a particular Cyclic Redundancy Check (CRC) mask. A value of a first bit can be chosen based upon a PHICH duration allocated for the current TTI, and a value of a second bit can be selected based upon a PHICH duration assigned for the subsequent TTI. Moreover, values for a third bit and a fourth bit can be selected as a function of a PHICH resource usage assigned for one of the current TTI or the subsequent TTI. Further, the particular CRC mask can be selected from a set of possible CRC masks based upon a PHICH resource usage allocated for the other one of the current TTI or the subsequent TTI not used for selecting the values for the third bit and the fourth bit. The set of possible CRC masks can include N different CRC masks, where N can be substantially any integer. For instance, N can be four; however, the claimed subject matter is not so limited. Each mask in the set of possible CRC masks can map to a corresponding PHICH resource usage value. By way of illustration, a CRC can be calculated for a transport block of PBCH, and the particular CRC mask selected from the set of possible CRC masks can be applied to a CRC portion of PBCH. The particular CRC mask can be applied using an XOR operation. Further, application of the particular CRC mask related to the PHICH resource value can be in addition to a disparate CRC mask related to a number of transmit antennas; however, the claimed subject matter is not so limited.

By way of a further example, the common encoded signal can include four bits related to the current PHICH resource assignment and the subsequent PHICH resource assignment. A value of a first bit can be chosen based upon a PHICH duration assigned for the current TTI, and a value of a second bit can be selected as a function of a PHICH duration assigned for the subsequent TTI. Moreover, values for a third bit and a fourth bit can be chosen based upon a PHICH resource usage allocated for the subsequent TTI. Following this example, an indication related to a PHICH resource usage assigned for the current TTI can be lacking in the common encoded signal.

It is to be appreciated in the aforementioned examples that the first bit, second bit, third bit, fourth bit, fifth bit, and sixth bit can each be positioned at any relative location with respect to each other within the common encoded signal. Moreover, although the bits are referred to as the first bit, second bit, third bit, fourth bit, fifth bit, and sixth bit, it is contemplated that these terms are not meant to connote any ordering of bits, and rather, are used for identification purposes.

Turning to FIG. 8, illustrated is a methodology 800 that facilitates obtaining signaled Physical Hybrid Automatic Repeat Request (HARQ) Indicator Channel (PHICH) resource assignments in a wireless communication environment. At 802, an encoded signal from a base station sent during a current Transmission Time Interval (TTI) can be received. For instance, the encoded signal can be received via a Physical Broadcast Channel (PBCH). According to another illustration, the encoded signal can obtained through dedicated Radio Resource Control (RRC) signaling during handover. Further, the current TTI is a TTI during which the encoded signal is transmitted by the base station.

At 804, the encoded signal can be decoded to recognize at least a portion of a current PHICH resource assignment for the current TTI. At 806, the encoded signal can be decoded to identify at least a portion of a subsequent PHICH resource assignment for a subsequent TTI. The subsequent TTI is a TTI occurring later in time as compared to the current TTI. For example, the subsequent TTI can be a next TTI immediately after the current TTI. By way of another example, a predefined function can be employed to identify the subsequent TTI as a function of the current TTI.

The current PHICH resource assignment and the subsequent PHICH resource assignment can each include a respective PHICH duration and a respective PHICH resource usage. The PHICH duration is a number of Orthogonal Frequency Division Multiplexing (OFDM) symbols used for PHICH. For example, the PHICH duration can be either one OFDM symbol or three OFDM symbols. Further, the PHICH resource usage can identify resource elements used for PHICH. By way of example, the PHICH resource usage can be one of four possible values: ⅙, ½, 1, or 2.

Moreover, a Physical Downlink Control Channel (PDCCH) can be decoded as a function of one or more of the current PHICH resource assignment or the subsequent PHICH resource assignment. A number of Orthogonal Frequency Division Multiplexing (OFDM) symbols (e.g., one, two, three, . . . ) used for the PDCCH in each subframe can be identified based upon an indication obtained via a Physical Control Format Indicator Channel (PCFICH). Further, resource elements utilized for the PDCCH can be discovered by discounting resource elements used for the PHICH, as provided by the one or more of the current PHICH resource assignment or the subsequent PHICH resource assignment (e.g., dependent upon TTI, . . . ), and the PCFICH (e.g., determined based upon a cell identifier (ID), . . . ).

By way of example, the encoded signal can include six bits related to the current PHICH resource assignment and the subsequent PHICH resource assignment. Following this example, a value of a first bit can be decoded to identify a PHICH duration assigned for the current TTI, and a value of a second bit can be decoded to recognize a PHICH duration allocated for the subsequent TTI. Further, values of a third bit and a fourth bit can be deciphered to recognize a PHICH resource usage allotted for the current TTI, and values of a fifth bit and a sixth bit can be deciphered to identify a PHICH resource usage assigned for the subsequent TTI.

Pursuant to another example, the encoded signal can include four bits related to the current PHICH resource assignment and the subsequent PHICH resource assignment, and a particular Cyclic Redundancy Check (CRC) mask. A value of a first bit can be decoded to recognize a PHICH duration allocated for the current TTI, and a value of a second bit can be deciphered to identify a PHICH duration assigned for the subsequent TTI. Moreover, values of a third bit and a fourth bit can be deciphered to identify a PHICH resource usage assigned for one of the current TTI or the subsequent TTI. Further, a PHICH resource usage allocated for the other one of the current TTI and the subsequent TTI not identified from the third bit and the fourth bit can be recognized based upon an identity of the particular CRC mask, from a set of possible CRC masks, carried by the encoded signal. The set of possible CRC masks can include N different CRC masks, where N can be substantially any integer. For instance, N can be four; however, the claimed subject matter is not so limited. Each mask in the set of possible CRC masks can map to a corresponding PHICH resource usage value. By way of illustration, the particular CRC mask selected from the set of possible CRC masks can be obtained from a CRC portion of PBCH. Further, the particular CRC mask related to the PHICH resource value can be in addition to a disparate CRC mask related to a number of transmit antennas; however, the claimed subject matter is not so limited.

By way of a further example, the encoded signal can include four bits related to the current PHICH resource assignment and the subsequent PHICH resource assignment. A value of a first bit can be decoded to recognize a PHICH duration assigned for the current TTI, and a value of a second bit can be decoded to identify a PHICH duration assigned for the subsequent TTI. Moreover, values of a third bit and a fourth bit can be decoded to discover a PHICH resource usage allocated for the subsequent TTI. Further, an indication related to a PHICH resource usage assigned for the current TTI can be lacking in the encoded signal.

It is to be appreciated in the aforementioned examples that the first bit, second bit, third bit, fourth bit, fifth bit, and sixth bit can each be positioned at any relative location with respect to each other within the encoded signal. Moreover, although the bits are referred to as the first bit, second bit, third bit, fourth bit, fifth bit, and sixth bit, it is contemplated that these terms are not meant to connote any ordering of bits, and rather, are used for identification purposes.

It will be appreciated that, in accordance with one or more aspects described herein, inferences can be made regarding signaling PHICH resource assignments in a wireless communication environment. As used herein, the term to "infer" or "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Figure 9:
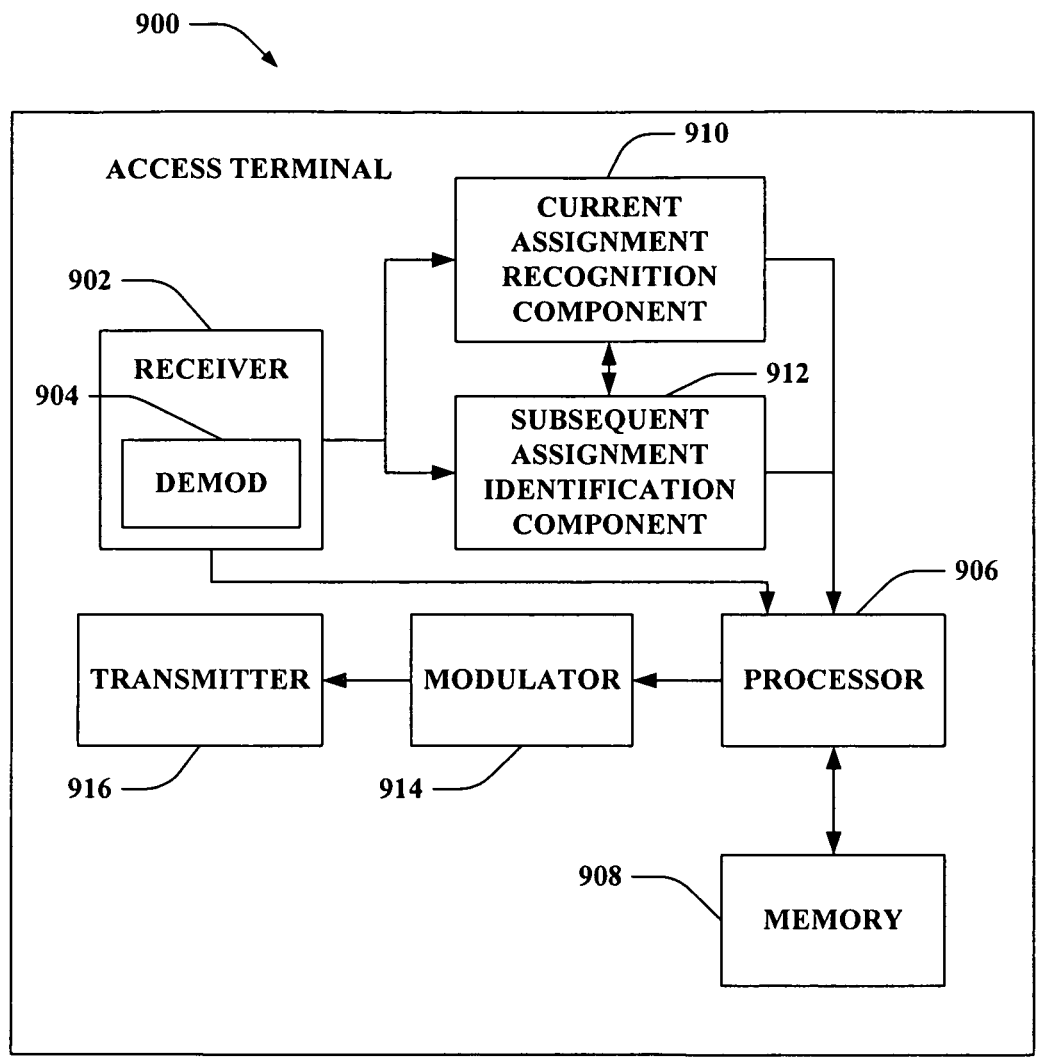
FIG. 9 is an illustration of an example access terminal that obtains signaled PHICH resource assignments in a wireless communication system.

FIG. 9 is an illustration of an access terminal 900 that obtains signaled PHICH resource assignments in a wireless communication system. Access terminal 900 comprises a receiver 902 that receives a signal from, for instance, a receive antenna (not shown), and performs typical actions thereon (e.g., filters, amplifies, downconverts, etc.) the received signal and digitizes the conditioned signal to obtain samples. Receiver 902 can be, for example, an MMSE receiver, and can comprise a demodulator 904 that can demodulate received symbols and provide them to a processor 906 for channel estimation. Processor 906 can be a processor dedicated to analyzing information received by receiver 902 and/or generating information for transmission by a transmitter 916, a processor that controls one or more components of access terminal 900, and/or a processor that both analyzes information received by receiver 902, generates information for transmission by transmitter 916, and controls one or more components of access terminal 900.

Access terminal 900 can additionally comprise memory 908 that is operatively coupled to processor 906 and that can store data to be transmitted, received data, and any other suitable information related to performing the various actions and functions set forth herein. Memory 908, for instance, can store protocols and/or algorithms associated with decoding PHICH resource assignments for a current TTI and a subsequent TTI.

It will be appreciated that the data store (e.g., memory 908) described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable PROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory 908 of the subject systems and methods is intended to comprise, without being limited to, these and any other suitable types of memory.

Processor 906 can be operatively coupled to a current assignment recognition component 910 and/or a subsequent assignment identification component 912. Current assignment recognition component 910 can be substantially similar to current assignment recognition component 212 of FIG. 2 and/or subsequent assignment identification component 912 can be substantially similar to subsequent assignment identification component 214 of FIG. 2. Current assignment recognition component 910 can decode a received signal (e.g., transmitted by a base station during a current TTI, . . . ) to yield a current PHICH resource assignment pertaining to the current TTI. Further, subsequent assignment identification component 912 can decode the received signal to yield a subsequent PHICH resource assignment corresponding to a subsequent TTI. Although not shown, it is contemplated that current assignment recognition component 910 and/or subsequent assignment identification component 912 can be included in a decoding component (e.g., decoding component 210 of FIG. 2, PBCH decoding component 302 of FIG. 3, . . . ). Moreover, although not depicted, it is contemplated that access terminal 900 can further include a PDCCH decoding component, which can be substantially similar to PDCCH decoding component 304 of FIG. 3. Access terminal 900 still further comprises a modulator 914 and a transmitter 916 that transmits data, signals, etc. to a base station. Although depicted as being separate from the processor 906, it is to be appreciated that current assignment recognition component 910, subsequent assignment identification component 912 and/or modulator 914 can be part of processor 906 or a number of processors (not shown).

Figure 10:
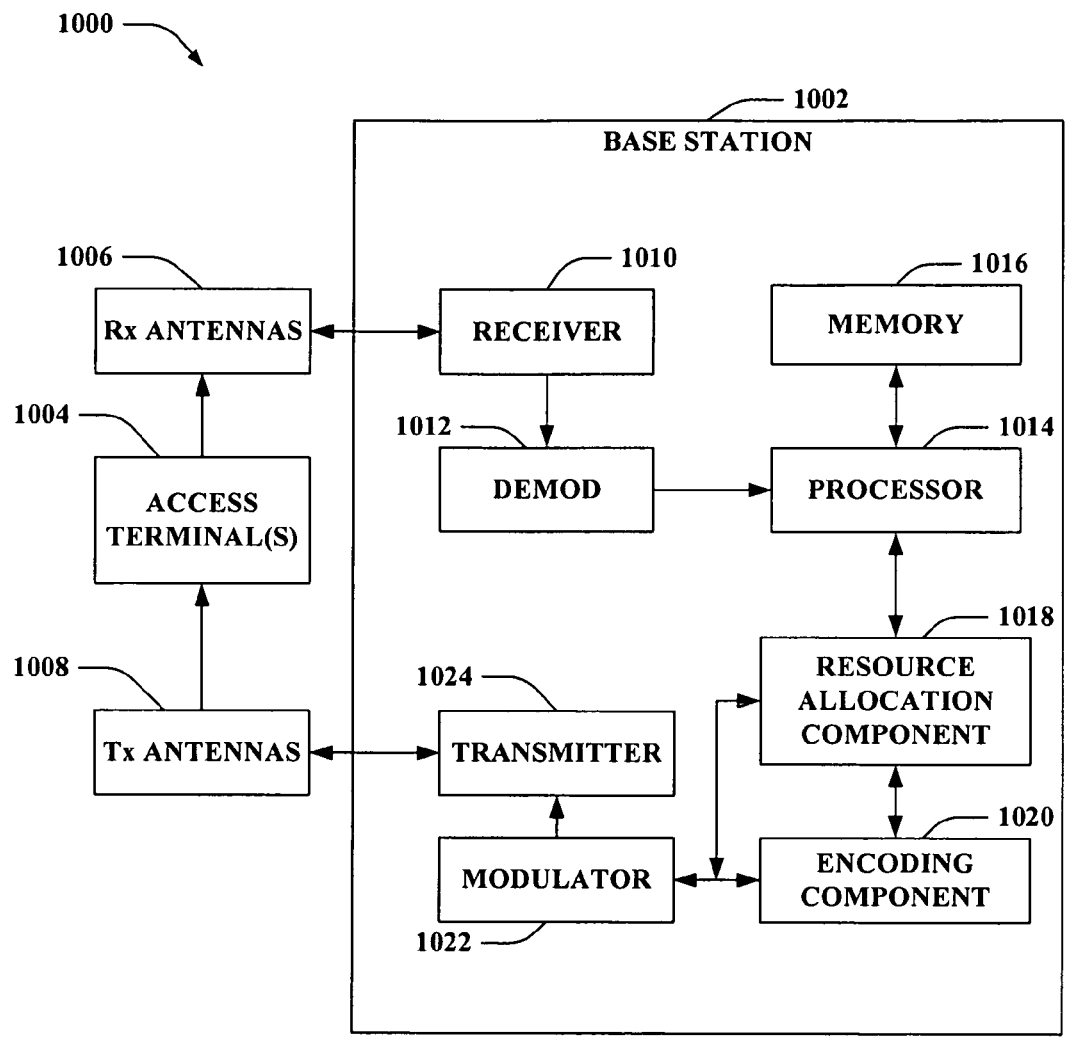
FIG. 10 is an illustration of an example system that signals PHICH resource assignments for a current TTI and a subsequent TTI in a wireless communication environment.

FIG. 10 is an illustration of a system 1000 that signals PHICH resource assignments for a current TTI and a subsequent TTI in a wireless communication environment. System 1000 comprises a base station 1002 (e.g., access point, . . . ) with a receiver 1010 that receives signal(s) from one or more access terminals 1004 through a plurality of receive antennas 1006, and a transmitter 1024 that transmits to the one or more access terminals 1004 through a transmit antenna 1008. Receiver 1010 can receive information from receive antennas 1006 and is operatively associated with a demodulator 1012 that demodulates received information. Demodulated symbols are analyzed by a processor 1014 that can be similar to the processor described above with regard to FIG. 9, and which is coupled to a memory 1016 that stores data to be transmitted to or received from access terminal(s) 1004 and/or any other suitable information related to performing the various actions and functions set forth herein. Processor 1014 is further coupled to a resource allocation component 1018 that generates PHICH resource assignments for access terminal(s) 1004. Moreover, base station 1002 can include an encoding component 1020 that can encode at least a portion of a current PHICH resource assignment corresponding to a current TTI and at least a portion of a subsequent PHICH resource assignment pertaining to a subsequent TTI in a common encoded signal. It is to be appreciated that resource allocation component 1018 can be substantially similar to resource allocation component 206 of FIG. 2 and/or encoding component 1020 can be substantially similar to encoding component 208 of FIG. 2. Base station 1002 can further include a modulator 1022. Modulator 1022 can multiplex a frame for transmission by a transmitter 1024 through antennas 1008 to access terminal(s) 1004 in accordance with the aforementioned description. Although depicted as being separate from the processor 1014, it is to be appreciated that resource allocation component 1018, encoding component 1020, and/or modulator 1022 can be part of processor 1014 or a number of processors (not shown).

Figure 11:
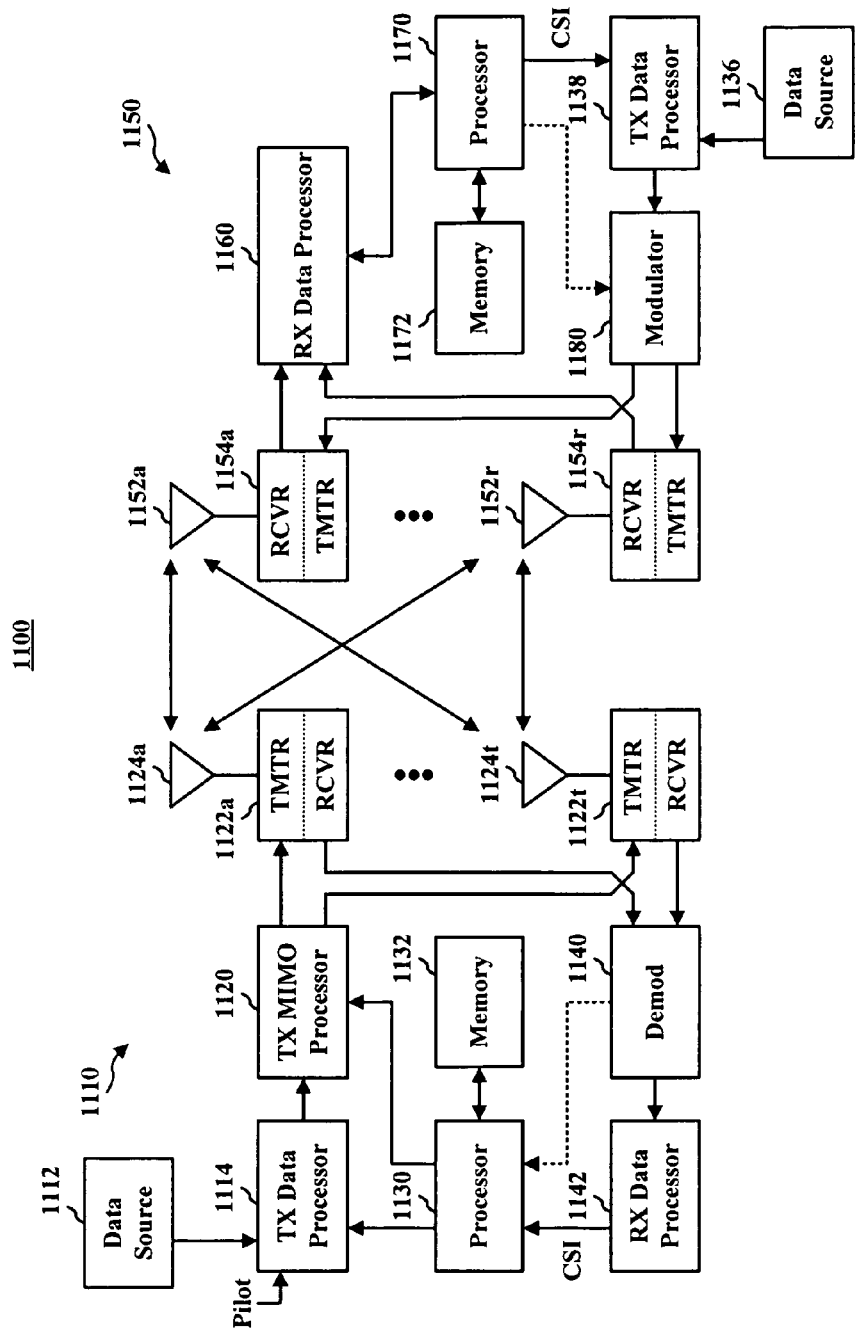
FIG. 11 is an illustration of an example wireless network environment that can be employed in conjunction with the various systems and methods described herein.

FIG. 11 shows an example wireless communication system 1100. The wireless communication system 1100 depicts one base station 1110 and one access terminal 1150 for sake of brevity. However, it is to be appreciated that system 1100 can include more than one base station and/or more than one access terminal, wherein additional base stations and/or access terminals can be substantially similar or different from example base station 1110 and access terminal 1150 described below. In addition, it is to be appreciated that base station 1110 and/or access terminal 1150 can employ the systems (FIGS. 1-3, 9-10, and 12-13) and/or methods (FIGS. 7-8) described herein to facilitate wireless communication there between.

At base station 1110, traffic data for a number of data streams is provided from a data source 1112 to a transmit (TX) data processor 1114. According to an example, each data stream can be transmitted over a respective antenna. TX data processor 1114 formats, codes, and interleaves the traffic data stream based on a particular coding scheme selected for that data stream to provide coded data.

The coded data for each data stream can be multiplexed with pilot data using orthogonal frequency division multiplexing (OFDM) techniques. Additionally or alternatively, the pilot symbols can be frequency division multiplexed (FDM), time division multiplexed (TDM), or code division multiplexed (CDM). The pilot data is typically a known data pattern that is processed in a known manner and can be used at access terminal 1150 to estimate channel response. The multiplexed pilot and coded data for each data stream can be modulated (e.g., symbol mapped) based on a particular modulation scheme (e.g., binary phase-shift keying (BPSK), quadrature phase-shift keying (QPSK), M-phase-shift keying (M-PSK), M-quadrature amplitude modulation (M-QAM), etc.) selected for that data stream to provide modulation symbols. The data rate, coding, and modulation for each data stream can be determined by instructions performed or provided by processor 1130.

The modulation symbols for the data streams can be provided to a TX MIMO processor 1120, which can further process the modulation symbols (e.g., for OFDM). TX MIMO processor 1120 then provides $N_T$ modulation symbol streams to $N_T$ transmitters (TMTR) 1122a through 1122t. In various embodiments, TX MIMO processor 1120 applies beamforming weights to the symbols of the data streams and to the antenna from which the symbol is being transmitted.

Each transmitter 1122 receives and processes a respective symbol stream to provide one or more analog signals, and further conditions (e.g., amplifies, filters, and upconverts) the analog signals to provide a modulated signal suitable for transmission over the MIMO channel. Further, $N_T$ modulated signals from transmitters 1122a through 1122t are transmitted from $N_T$ antennas 1124a through 1124t, respectively.

At access terminal 1150, the transmitted modulated signals are received by $N_R$ antennas 1152a through 1152r and the received signal from each antenna 1152 is provided to a respective receiver (RCVR) 1154a through 1154r. Each receiver 1154 conditions (e.g., filters, amplifies, and downconverts) a respective signal, digitizes the conditioned signal to provide samples, and further processes the samples to provide a corresponding "received" symbol stream.

An RX data processor 1160 can receive and process the $N_R$ received symbol streams from $N_R$ receivers 1154 based on a particular receiver processing technique to provide $N_T$ "detected" symbol streams. RX data processor 1160 can demodulate, deinterleave, and decode each detected symbol stream to recover the traffic data for the data stream. The processing by RX data processor 1160 is complementary to that performed by TX MIMO processor 1120 and TX data processor 1114 at base station 1110.

A processor 1170 can periodically determine which available technology to utilize as discussed above. Further, processor 1170 can formulate a reverse link message comprising a matrix index portion and a rank value portion.

The reverse link message can comprise various types of information regarding the communication link and/or the received data stream. The reverse link message can be processed by a TX data processor 1138, which also receives traffic data for a number of data streams from a data source 1136, modulated by a modulator 1180, conditioned by transmitters 1154a through 1154r, and transmitted back to base station 1110.

At base station 1110, the modulated signals from access terminal 1150 are received by antennas 1124, conditioned by receivers 1122, demodulated by a demodulator 1140, and processed by a RX data processor 1142 to extract the reverse link message transmitted by access terminal 1150. Further, processor 1130 can process the extracted message to determine which precoding matrix to use for determining the beamforming weights.

Processors 1130 and 1170 can direct (e.g., control, coordinate, manage, etc.) operation at base station 1110 and access terminal 1150, respectively. Respective processors 1130 and 1170 can be associated with memory 1132 and 1172 that store program codes and data. Processors 1130 and 1170 can also perform computations to derive frequency and impulse response estimates for the uplink and downlink, respectively.

In an aspect, logical channels are classified into Control Channels and Traffic Channels. Logical Control Channels can include a Broadcast Control Channel (BCCH), which is a DL channel for broadcasting system control information. Further, Logical Control Channels can include a Paging Control Channel (PCCH), which is a DL channel that transfers paging information. Moreover, the Logical Control Channels can comprise a Multicast Control Channel (MCCH), which is a Point-to-multipoint DL channel used for transmitting Multimedia Broadcast and Multicast Service (MBMS) scheduling and control information for one or several MTCHs. Generally, after establishing a Radio Resource Control (RRC) connection, this channel is only used by UEs that receive MBMS (e.g., old MCCH+MSCH). Additionally, the Logical Control Channels can include a Dedicated Control Channel (DCCH), which is a Point-to-point bi-directional channel that transmits dedicated control information and can be used by UEs having a RRC connection. In an aspect, the Logical Traffic Channels can comprise a Dedicated Traffic Channel (DTCH), which is a Point-to-point bidirectional channel dedicated to one UE for the transfer of user information. Also, the Logical Traffic Channels can include a Multicast Traffic Channel (MTCH) for Point-to-multipoint DL channel for transmitting traffic data.

In an aspect, Transport Channels are classified into DL and UL. DL Transport Channels comprise a Broadcast Channel (BCH), a Downlink Shared Data Channel (DL-SDCH) and a Paging Channel (PCH). The PCH can support UE power saving (e.g., Discontinuous Reception (DRX) cycle can be indicated by the network to the UE, . . . ) by being broadcasted over an entire cell and being mapped to Physical layer (PHY) resources that can be used for other control/traffic channels. The UL Transport Channels can comprise a Random Access Channel (RACH), a Request Channel (REQCH), a Uplink Shared Data Channel (UL-SDCH) and a plurality of PHY channels.

The PHY channels can include a set of DL channels and UL channels. For example, the DL PHY channels can include: Common Pilot Channel (CPICH); Synchronization Channel (SCH); Common Control Channel (CCCH); Shared DL Control Channel (SDCCH); Multicast Control Channel (MCCH); Shared UL Assignment Channel (SUACH); Acknowledgement Channel (ACKCH); DL Physical Shared Data Channel (DL-PSDCH); UL Power Control Channel (UPCCH); Paging Indicator Channel (PICH); and/or Load Indicator Channel (LICH). By way of further illustration, the UL PHY Channels can include: Physical Random Access Channel (PRACH); Channel Quality Indicator Channel (CQICH); Acknowledgement Channel (ACKCH); Antenna Subset Indicator Channel (ASICH); Shared Request Channel (SREQCH); UL Physical Shared Data Channel (UL-PSDCH); and/or Broadband Pilot Channel (BPICH).

It is to be understood that the embodiments described herein can be implemented in hardware, software, firmware, middleware, microcode, or any combination thereof. For a hardware implementation, the processing units can be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

When the embodiments are implemented in software, firmware, middleware or microcode, program code or code segments, they can be stored in a machine-readable medium, such as a storage component. A code segment can represent a procedure, a function, a subprogram, a program, a routine, a subroutine, a module, a software package, a class, or any combination of instructions, data structures, or program statements. A code segment can be coupled to another code segment or a hardware circuit by passing and/or receiving information, data, arguments, parameters, or memory contents. Information, arguments, parameters, data, etc. can be passed, forwarded, or transmitted using any suitable means including memory sharing, message passing, token passing, network transmission, etc.

For a software implementation, the techniques described herein can be implemented with modules (e.g., procedures, functions, and so on) that perform the functions described herein. The software codes can be stored in memory units and executed by processors. The memory unit can be implemented within the processor or external to the processor, in which case it can be communicatively coupled to the processor via various means as is known in the art.

Figure 12:
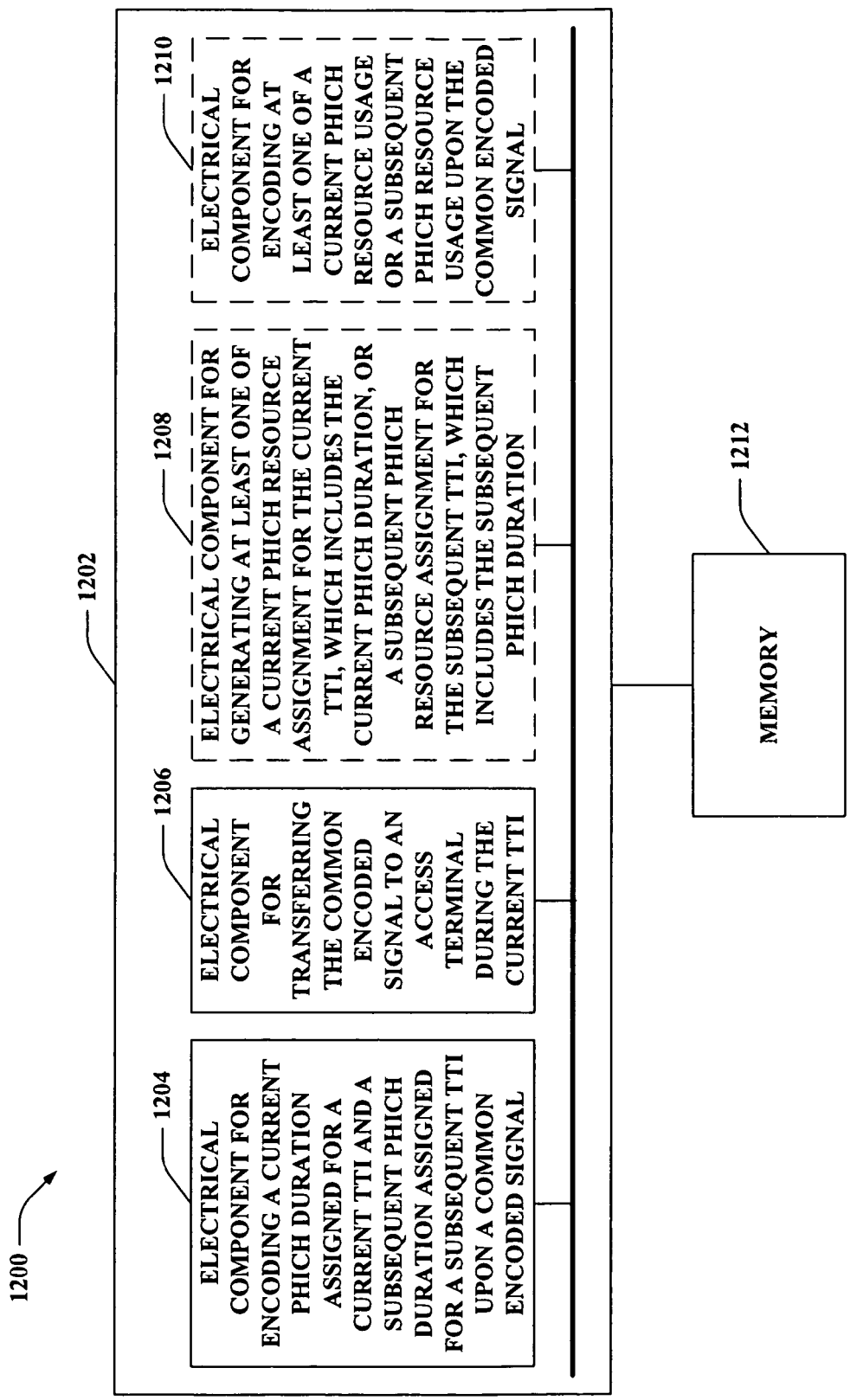
FIG. 12 is an illustration of an example system that enables signaling Physical Hybrid Automatic Repeat Request (HARQ) Indicator Channel (PHICH) resource assignments in a wireless communication environment.

With reference to FIG. 12, illustrated is a system 1200 that enables signaling Physical Hybrid Automatic Repeat Request (HARQ) Indicator Channel (PHICH) resource assignments in a wireless communication environment. For example, system 1200 can reside at least partially within a base station. It is to be appreciated that system 1200 is represented as including functional blocks, which can be functional blocks that represent functions implemented by a processor, software, or combination thereof (e.g., firmware). System 1200 includes a logical grouping 1202 of electrical components that can act in conjunction. For instance, logical grouping 1202 can include an electrical component for encoding a current PHICH duration assigned for a current Transmission Time Interval (TTI) and a subsequent PHICH duration assigned for a subsequent TTI upon a common encoded signal 1204. Moreover, logical grouping 1202 can include an electrical component for transferring the common encoded signal to an access terminal during the current TTI 1206. Further, logical grouping 1202 can optionally include an electrical component for generating at least one of a current PHICH resource assignment for the current TTI, which includes the current PHICH duration, or a subsequent PHICH resource assignment for the subsequent TTI, which includes the subsequent PHICH duration 1208. Logical grouping 1202 can also optionally include an electrical component for encoding at least one of a current PHICH resource usage or a subsequent PHICH resource usage upon the common encoded signal 1210. Additionally, system 1200 can include a memory 1212 that retains instructions for executing functions associated with electrical components 1204, 1206, 1208, and 1210. While shown as being external to memory 1212, it is to be understood that one or more electrical components 1204, 1206, 1208, and 1210 can exist within memory 1212.

Figure 13:
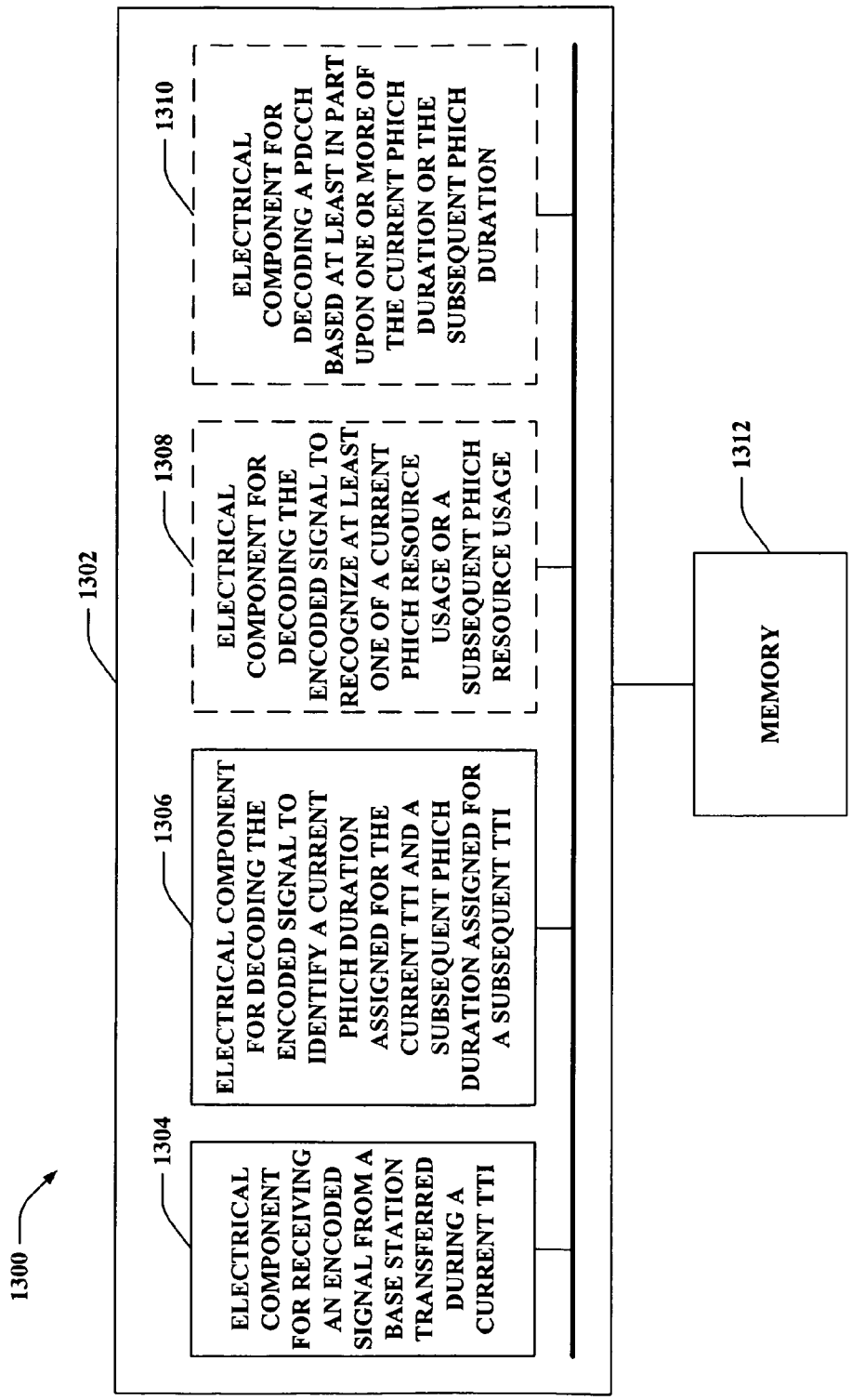
FIG. 13 is an illustration of an example system that enables receiving signaled Physical Hybrid Automatic Repeat Request (HARQ) Indicator Channel (PHICH) resource assignments in a wireless communication environment.

With reference to FIG. 13, illustrated is a system 1300 that enables receiving signaled Physical Hybrid Automatic Repeat Request (HARQ) Indicator Channel (PHICH) resource assignments in a wireless communication environment. For example, system 1300 can reside within an access terminal. It is to be appreciated that system 1300 is represented as including functional blocks, which can be functional blocks that represent functions implemented by a processor, software, or combination thereof (e.g., firmware). System 1300 includes a logical grouping 1302 of electrical components that can act in conjunction. For instance, logical grouping 1302 can include an electrical component for receiving an encoded signal from a base station transferred during a current Transmission Time Interval (TTI) 1304. Further, logical grouping 1302 can include an electrical component for decoding the encoded signal to identify a current PHICH duration assigned for the current TTI and a subsequent PHICH duration assigned for a subsequent TTI 1306. Moreover, logical grouping 1302 can optionally include an electrical component for decoding the encoded signal to recognize at least one of a current PHICH resource usage or a subsequent PHICH resource usage 1308. Logical grouping 1302 can also optionally include an electrical component for decoding a Physical Downlink Control Channel (PDCCH) based at least in part upon one or more of the current PHICH duration or the subsequent PHICH duration 1310. Additionally, system 1300 can include a memory 1312 that retains instructions for executing functions associated with electrical components 1304, 1306, 1308, and 1310. While shown as being external to memory 1312, it is to be understood that one or more of electrical components 1304, 1306, 1308, and 1310 can exist within memory 1312.

What has been described above includes examples of one or more embodiments. It is, of course, not possible to describe every conceivable combination of components or methodologies for purposes of describing the aforementioned embodiments, but one of ordinary skill in the art may recognize that many further combinations and permutations of various embodiments are possible. Accordingly, the described embodiments are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method that facilitates disseminating Physical Hybrid Automatic Repeat Request (HARQ) Indicator Channel (PHICH) resource assignments in a wireless communication environment, comprising:
   encoding at least a portion of a current PHICH resource assignment for a current Transmission Time Interval (TTI) and at least a portion of a subsequent PHICH resource assignment for a subsequent TTI within a common encoded signal; and
   transmitting the common encoded signal to an access terminal during the current TTI.

2. The method of claim 1, wherein the current PHICH resource assignment and the subsequent PHICH resource assignment each include a respective PHICH duration, which indicates a number of Orthogonal Frequency Division Multiplexing (OFDM) symbols used for PHICH, and a respective PHICH resource usage, which identifies resource elements used for PHICH.

3. The method of claim 1, further comprising generating the current PHICH resource assignment for the current TTI and the subsequent PHICH resource assignment for the subsequent TTI.

4. The method of claim 1, further comprising transmitting the common encoded signal via at least one of a Physical Broadcast Channel (PBCH) or dedicated Radio Resource Control (RRC) signaling during handover.

5. The method of claim 1, wherein the subsequent TTI is a next TTI immediately after the current TTI.

6. The method of claim 1, wherein the common encoded signal includes six bits related to the current PHICH resource assignment and the subsequent PHICH resource assignment.

7. The method of claim 6, further comprising:
selecting a value of a first bit as a function of a PHICH duration assigned for the current TTI;
choosing a value of a second bit based upon a PHICH duration allocated for the subsequent TTI;
selecting values of a third bit and a fourth bit as a function of a PHICH resource usage allotted for the current TTI; and
choosing values of a fifth bit and a sixth bit based upon a PHICH resource usage assigned for the subsequent TTI.

8. The method of claim 1, wherein the common encoded signal includes four bits and a particular Cyclic Redundancy Check (CRC) mask related to the current PHICH resource assignment and the subsequent PHICH resource assignment.

9. The method of claim 8, further comprising:
choosing a value of a first bit based upon a PHICH duration allocated for the current TTI;
selecting a value of a second bit based upon a PHICH duration assigned for the subsequent TTI;
selecting values of a third bit and a fourth bit as a function of a PHICH resource usage assigned for one of the current TTI or the subsequent TTI; and
selecting the particular CRC mask from a set of possible CRC masks that maps to a PHICH resource usage assigned to one of the current TTI or the subsequent TTI not used for selecting the values of the third bit and the fourth bit.

10. The method of claim 1, wherein the common encoded signal includes four bits related to the current PHICH resource assignment and the subsequent PHICH resource assignment.

11. The method of claim 10, further comprising:
choosing a value of a first bit based upon a PHICH duration assigned for the current TTI;
selecting a value of a second bit as a function of a PHICH duration assigned for the subsequent TTI; and
choosing values of a third bit and a fourth bit based upon a PHICH resource usage allocated for the subsequent TTI.

12. A wireless communications apparatus, comprising:
a memory that retains instructions related to encoding at least a portion of a current Physical Hybrid Automatic Repeat Request (HARQ) Indicator Channel (PHICH) resource assignment for a current Transmission Time Interval (TTI) and at least a portion of a subsequent PHICH resource assignment for a subsequent TTI within a common encoded signal, and sending the common encoded signal to an access terminal during the current TTI; and
a processor, coupled to the memory, configured to execute the instructions retained in the memory.

13. The wireless communications apparatus of claim 12, wherein the current PHICH resource assignment and the subsequent PHICH resource assignment each include a respective PHICH duration, which indicates a number of Orthogonal Frequency Division Multiplexing (OFDM) symbols used for PHICH, and a respective PHICH resource usage, which identifies resource elements used for PHICH.

14. The wireless communications apparatus of claim 12, wherein the memory further retains instructions related to generating one or more of the current PHICH resource assignment for the current TTI or the subsequent PHICH resource assignment for the subsequent TTI.

15. The wireless communications apparatus of claim 12, wherein the memory further retains instructions related to sending the common encoded signal via at least one of a Physical Broadcast Channel (PBCH) or dedicated Radio Resource Control (RRC) signaling during handover.

16. The wireless communications apparatus of claim 12, wherein the memory further retains instructions related to selecting a value of a first bit of the common encoded signal as a function of a PHICH duration assigned for the current TTI, choosing a value of a second bit of the common encoded signal based upon a PHICH duration allocated for the subsequent TTI, selecting values of a third bit and a fourth bit of the common encoded signal as a function of a PHICH resource usage allotted for the current TTI, and choosing values of a fifth bit and a sixth bit of the common encoded signal based upon a PHICH resource usage assigned for the subsequent TTI.

17. The wireless communications apparatus of claim 12, wherein the memory further retains instructions related to choosing a value of a first bit of the common encoded signal based upon a PHICH duration allocated for the current TTI, selecting a value of a second bit of the common encoded signal based upon a PHICH duration assigned for the subsequent TTI, selecting values of a third bit and a fourth bit of the common encoded signal as a function of a PHICH resource usage assigned for one of the current TTI or the subsequent TTI, selecting a particular Cyclic Redundancy Check (CRC) mask from a set of possible CRC masks that maps to a PHICH resource usage assigned to one of the current TTI or the subsequent TTI not used for selecting the values of the third bit and the fourth bit, and applying the particular CRC mask to a CRC portion of the common encoded signal.

18. The wireless communications apparatus of claim 12, wherein the memory further retains instructions related to choosing a value of a first bit of the common encoded signal based upon a PHICH duration assigned for the current TTI, selecting a value of a second bit of the common encoded signal as a function of a PHICH duration assigned for the subsequent TTI, choosing values of a third bit and a fourth of the common encoded signal bit based upon a PHICH resource usage allocated for the subsequent TTI, and refraining from indicating a PHICH resource usage assigned for the current TTI as part of the common encoded signal.

19. A wireless communications apparatus that enables signaling Physical Hybrid Automatic Repeat Request (HARQ) Indicator Channel (PHICH) resource assignments in a wireless communication environment, comprising:
means for encoding a current PHICH duration assigned for a current Transmission Time Interval (TTI) and a subsequent PHICH duration assigned for a subsequent TTI upon a common encoded signal; and
means for transferring the common encoded signal to an access terminal during the current TTI.

20. The wireless communications apparatus of claim 19, wherein the common encoded signal includes two bits related to the current PHICH duration and the subsequent PHICH duration.

21. The wireless communications apparatus of claim 19, further comprising means for generating at least one of a current PHICH resource assignment for the current TTI, which includes the current PHICH duration, or a subsequent PHICH resource assignment for the subsequent TTI, which includes the subsequent PHICH duration.

22. The wireless communications apparatus of claim 19, further comprising means for encoding at least one of a current PHICH resource usage or a subsequent PHICH resource usage upon the common encoded signal.

23. The wireless communications apparatus of claim 22, wherein the common encoded signal includes four bits related to the current PHICH resource usage and the subsequent PHICH resource usage.

24. The wireless communications apparatus of claim 22, wherein the common encoded signal includes two bits related to one of the current PHICH resource usage or the subsequent PHICH resource usage.

25. The wireless communications apparatus of claim 24, wherein the common encoded signal includes a Cyclic Redundancy Check (CRC) mask related to one of the current PHICH resource usage or the subsequent PHICH resource usage.

26. A computer program product, comprising:
a non-transitory computer-readable medium comprising:
code for encoding a current Physical Hybrid Automatic Repeat Request (HARQ) Indicator Channel (PHICH) duration assigned for a current Transmission Time Interval (TTI) and a subsequent PHICH duration assigned for a subsequent TTI upon a common encoded signal; and
code for transmitting the common encoded signal to an access terminal during the current TTI.

27. The computer program product of claim 26, wherein the non-transitory computer-readable medium further comprises code for selecting values of two bits of the common encoded signal based upon the current PHICH duration and the subsequent PHICH duration.

28. The computer program product of claim 26, wherein the non-transitory computer-readable medium further comprises code for encoding at least one of a current PHICH resource usage or a subsequent PHICH resource usage upon the common encoded signal.

29. The computer program product of claim 28, wherein the non-transitory computer-readable medium further comprises code for selecting values of at least two bits of the common encoded signal as a function of the at least one of the current PHICH resource usage or the subsequent PHICH resource usage.

30. A wireless communications apparatus, comprising:
a processor configured to:
yield at least one of a current Physical Hybrid Automatic Repeat Request (HARQ) Indicator Channel (PHICH) resource assignment for a current Transmission Time Interval (TTI) or a subsequent PHICH resource assignment for a subsequent TTI, wherein the current PHICH resource assignment and the subsequent PHICH resource assignment each include a respective PHICH duration, which indicates a number of Orthogonal Frequency Division Multiplexing (OFDM) symbols used for PHICH, and a respective PHICH resource usage, which identifies resource elements used for PHICH;
encode at least a portion of the current PHICH resource assignment and at least a portion of the subsequent PHICH resource assignment within a common encoded signal; and
transmit the common encoded signal to an access terminal during the current TTI.

31. The wireless communications apparatus of claim 30, wherein the processor is further configured to encode a current PHICH duration, included in the current PHICH resource assignment, and a subsequent PHICH duration, included in the subsequent PHICH resource assignment, within the common encoded signal.

32. A method that facilitates obtaining signaled Physical Hybrid Automatic Repeat Request (HARQ) Indicator Channel (PHICH) resource assignments in a wireless communication environment, comprising:
receiving an encoded signal from a base station sent during a current Transmission Time Interval (TTI);
decoding the encoded signal to recognize at least a portion of a current PHICH resource assignment for the current TTI; and
decoding the encoded signal to identify at least a portion of a subsequent PHICH resource assignment for a subsequent TTI.

33. The method of claim 32, further comprising receiving the encoded signal via at least one of a Physical Broadcast Channel (PBCH) or dedicated Radio Resource Control (RRC) signaling during handover.

34. The method of claim 32, wherein the current PHICH resource assignment and the subsequent PHICH resource assignment each include a respective PHICH duration, which indicates a number of Orthogonal Frequency Division Multiplexing (OFDM) symbols used for PHICH, and a respective PHICH resource usage, which identifies resource elements used for PHICH.

35. The method of claim 32, further comprising decoding a Physical Downlink Control Channel (PDCCH) as a function of one or more of the current PHICH resource assignment or the subsequent PHICH resource assignment.

36. The method of claim 32, further comprising:
identifying a PHICH duration assigned for the current TTI by decoding a value of a first bit of the encoded signal;
recognizing a PHICH duration allocated for the subsequent TTI by decoding a value of a second bit of the encoded signal;
recognizing a PHICH resource usage allotted for the current TTI by deciphering values of a third bit and a fourth bit of the encoded signal; and
identifying a PHICH resource usage assigned to the subsequent TTI by deciphering values of a fifth bit and a sixth bit of the encoded signal.

37. The method of claim 32, further comprising:
recognizing a PHICH duration allocated for the current TTI by decoding a value of a first bit of the encoded signal;
identifying a PHICH duration assigned for the subsequent TTI by deciphering a value of a second bit of the encoded signal;
identifying a PHICH resource usage assigned for one of the current TTI or the subsequent TTI by deciphering values of a third bit and a fourth bit of the encoded signal; and
recognizing a PHICH resource usage allocated for the other one of the current TTI or the subsequent TTI not identified from the third bit and the fourth bit based upon a particular Cyclic Redundancy Check (CRC) mask from a set of possible CRC masks carried by the encoded signal.

38. The method of claim 32, further comprising:
recognizing a PHICH duration assigned for the current TTI by decoding a value of a first bit of the encoded signal;
identifying a PHICH duration assigned for the subsequent TTI by decoding a value of a second bit of the encoded signal; and discovering a PHICH resource usage allocated for the subsequent TTI by decoding values of a third bit and a fourth bit.

39. A wireless communications apparatus, comprising:
   a memory that retains instructions related to receiving an encoded signal from a base station sent during a current Transmission Time Interval (TTI), and decoding the encoded signal to recognize at least a portion of a current Physical Hybrid Automatic Repeat Request (HARQ) Indicator Channel (PHICH) resource assignment for the current TTI and at least a portion of a subsequent PHICH resource assignment for a subsequent TTI; and
   a processor, coupled to the memory, configured to execute the instructions retained in the memory.

40. The wireless communications apparatus of claim 39, wherein the current PHICH resource assignment and the subsequent PHICH resource assignment each include a respective PHICH duration, which indicates a number of Orthogonal Frequency Division Multiplexing (OFDM) symbols used for PHICH, and a respective PHICH resource usage, which identifies resource elements used for PHICH.

41. The wireless communications apparatus of claim 39, wherein the memory further retains instructions related to decoding a Physical Downlink Control Channel (PDCCH) as a function of one or more of the current PHICH resource assignment or the subsequent PHICH resource assignment.

42. A wireless communications apparatus that enables receiving signaled Physical Hybrid Automatic Repeat Request (HARQ) Indicator Channel (PHICH) resource assignments in a wireless communication environment, comprising:
   means for receiving an encoded signal from a base station transferred during a current Transmission Time Interval (TTI); and
   means for decoding the encoded signal to identify a current PHICH duration assigned for the current TTI and a subsequent PHICH duration assigned for a subsequent TTI.

43. The wireless communications apparatus of claim 42, further comprising means for decoding the encoded signal to recognize at least one of a current PHICH resource usage or a subsequent PHICH resource usage.

44. The wireless communications apparatus of claim 42, further comprising means for decoding a Physical Downlink Control Channel (PDCCH) based at least in part upon one or more of the current PHICH duration or the subsequent PHICH duration.

45. The wireless communications apparatus of claim 42, wherein the encoded signal is received via at least one of a Physical Broadcast Channel (PBCH) or dedicated Radio Resource Control (RRC) signaling during handover.

46. A computer program product, comprising:
   a non-transitory computer-readable medium comprising:
      code for receiving an encoded signal from a base station transferred during a current Transmission Time Interval (TTI) via at least one of a Physical Broadcast Channel (PBCH) or dedicated Radio Resource Control (RRC) signaling during handover; and
      code for decoding the encoded signal to identify a current Physical Hybrid Automatic Repeat Request (HARQ) Indicator Channel (PHICH) duration assigned for the current TTI and a subsequent PHICH duration assigned for a subsequent TTI.

47. The computer program product of claim 46, wherein the non-transitory computer-readable medium further comprises code for decoding the encoded signal to recognize a subsequent PHICH resource usage associated with the subsequent TTI.

48. The computer program product of claim 47, wherein the non-transitory computer-readable medium further comprises code for decoding the encoded signal to identify a current PHICH resource usage associated with the current TTI.

49. A wireless communications apparatus, comprising:
   a processor configured to:
      identify a current Physical Hybrid Automatic Repeat Request (HARQ) Indicator Channel (PHICH) duration allocated for a current Transmission Time Interval (TTI) by decoding an encoded signal obtained from a base station, the encoded signal being sent during the current TTI;
      recognize a subsequent PHICH duration assigned for a subsequent TTI by decoding the encoded signal; and
      discover a subsequent PHICH resource usage allocated for the subsequent TTI by decoding the encoded signal.

50. The wireless communications apparatus of claim 49, wherein the processor is further configured to identify a current PHICH duration assigned for the current TTI by decoding the encoded signal.

* * * * *